United States Patent [19]

Madon

[11] Patent Number: 4,481,383

[45] Date of Patent: Nov. 6, 1984

[54] COMMUNICATION SYSTEM RECORDING ARRANGEMENT

[75] Inventor: James J. Madon, Lisle, Ill.

[73] Assignee: AT&T Bell Laboratories, Murray Hill, N.J.

[21] Appl. No.: 486,990

[22] Filed: Apr. 20, 1983

[51] Int. Cl.³ ............................................. H04M 15/18
[52] U.S. Cl. .............................. 179/7.1 R; 179/18 BC; 179/9
[58] Field of Search ............... 179/7.1 R, 7 R, 18 BC, 179/7 MM, 8 A, 8.5, 9, 10, 11, 12; 370/62

[56] References Cited

U.S. PATENT DOCUMENTS 3,510,594  5/1970  Oden .............................. 179/18 BC Primary Examiner—Stafford D. Schreyer
Attorney, Agent, or Firm—C. H. Davis

[57] ABSTRACT

A telephone network having an audio/data conference arrangement wherein a billing record is kept for each audio and data conference leg and each conference bridge. Suitable billing allowances are computed if a conference leg is used to reestablish another leg that had disconnected. Also, billing for all audio conference legs is interrupted while an operator is connected to the conference.

6 Claims, 32 Drawing Figures

FIG. 5 DATA STORE 125

PORT 602

DATA LINK PROCESSOR 601

FIG. 10 DATA BRIDGE PROCESSOR 600

MAIN PROCESSOR SYSTEM

CHECK ERROR THRESHOLD

CONTACT OPERATOR

COLLECT DIALED DIGITS

LEGEND

◇ = SYSTEM DECISION

▢ = CUSTOMER ACTION

□ = SYSTEM ACTION

FIG. 31
LEG BILLING RECORD

| TYPE | | CONF ID | LEG ID | CONT | CALLED NUMBER | | | BILL'G TYPE | CHG COND |
|---|---|---|---|---|---|---|---|---|---|
| AUDIO | DATA | | | | NPA | XXX | XXXX | | |
| CUST IN CONTROL | OPP LEG | ANS TIME | DISC TIME | MPD | CALLING NUMBER | | | | |
| | | | | | NPA | XXX | XXXX | | |
| OPR ESTAB | OPR ID | INFO DIGIT | LEG ENABLED | LEG DROPPED | BILLING NUMBER | | | | |
| | | | | | NPA | XXX | XXXX | | |
| ALLOWANCE START TIME | ALLOWANCE END TIME | | ALLOWANCE ELAPSE TIME | | NO. OF ALLOWANCES | | | NEXT LEG IDX | LAST LEG IDX |

FIG. 32
BRIDGE BILLING RECORD

| TYPE | | CONF. ID | BILL'G TYPE | SPL BILL'G NUMBER | | | PORTS RESERVED | | CHG COND |
|---|---|---|---|---|---|---|---|---|---|
| AUDIO | DATA | | | NPA | XXX | XXXX | OPR | CUST | |
| ANS. TIME | DISC TIME | MPD | CALLING NUMBER | | | NO. OF LEGS ESTAB. | OPR ESTAB | INFO DIGIT | |
| | | | NPA | XXX | XXXX | | | | |

COMMUNICATION SYSTEM RECORDING ARRANGEMENT

TECHNICAL FIELD

This invention relates to communication systems and particularly to arrangements for billing a customer for services rendered by the system.

In a more particular aspect, this invention relates to a method and apparatus for determining the charges for a service based on the nature of the use of a particular facility in addition to how long the facility was used.

In a still more particular aspect, this invention relates to a method and apparatus for automatically and selectively charging customers for the various facilities utilized in a network, conferencing arrangement.

BACKGROUND OF THE INVENTION

In the present state of the art, the charges for a point-to-point telephone connection generally are computed from the time the called party answers until the time of disconnect taking into consideration the time of day, class of service, whether operator assistance was required etc. If the call is accidentally interrupted, one of the parties usually dials an operator in order to have the operator reestablish the connection and give credit for the original call.

While this arrangement is suitable for its intended purpose, it requires the assistance of an operator. Furthermore, since the billing is determined by the busy/idle condition of the facility, charges cannot be adjusted to reflect other call states, as for example, when a facility is reserved for future use but is not yet in a busy condition, or when a facility is being used to reestablish a connection that was inadvertently interrupted.

SUMMARY OF THE INVENTION

The foregoing problem is solved, and a technical advance is achieved by an arrangement for ascertaining the various states of a facility during a call in order to dynamically adjust the charges for the call when the facility is used for different functions.

More specifically, the present invention comprises a method and apparatus for monitoring network facilities such as trunks, to be used by a customer. These facilities can assume many states such as, active, idle, in reserve etc., and charges are computed in accordance with the particular state of the facility and for what purpose the facility is being used in a particular state. For example, charges will be incurred only when facilities are active and reserved and not when facilities are idle. A situation arises, however, where service on an active facility is interrupted and another facility must be activated to regain access to the interrupted facility. According to a feature of the invention, charges for the facility are adjusted to compensate for the time that active facilities are used to reestablish the interrupted service.

The invention finds particular utility in an illustrative network conferencing arrangement wherein the originator is charged for his path to the conference bridge, the paths between the bridge and each conferee, and for the use of the bridging facility including all idle ports that are held in reserve for conferees that may be added to the conference at some later time. If a conferee is inadvertently disconnected from an active port, billing for that path to the port is adjusted to reflect the disconnect. Also, billing for the originator's path is adjusted while the originator uses his or her path in attempting to reconnect the conferee. Furthermore, billing can be adjusted when an operator intervenes on an active conference to give assistance to the conferees.

BRIEF DESCRIPTION OF THE DRAWING

FIGS. 31 and 32 show typical bridge and leg billing records.

GENERAL SYSTEM DESCRIPTION

Figure 1:
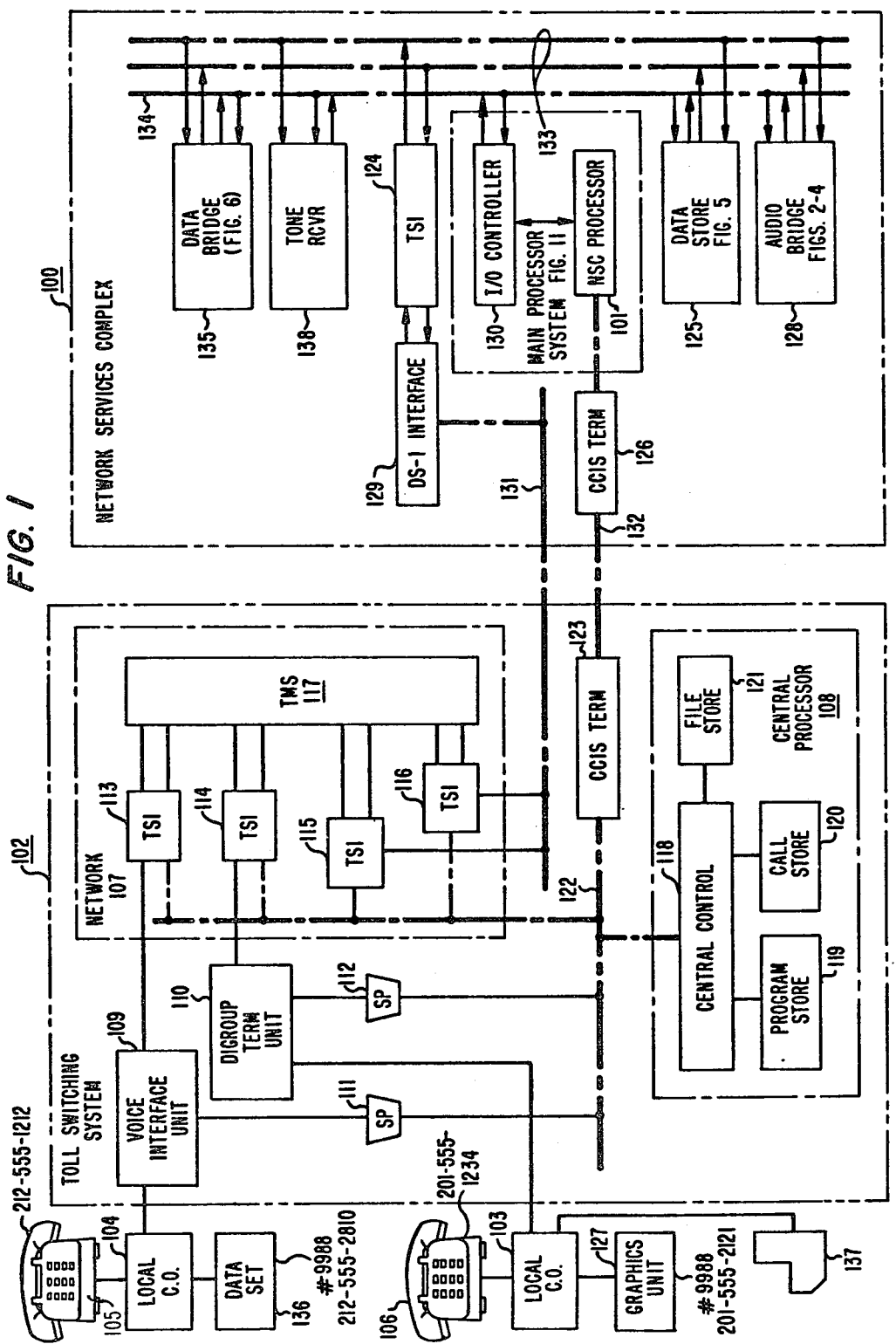
FIG. 1 shows a block diagram of a telephone network having a toll switching system equipped with a network services complex for providing conference services.

The general organization of a system employing the invention is illustrated in the block diagram of FIG. 1 which shows a typical communication network having a toll switching system 102 which serves local telephone central offices 103 and 104. Central offices 104 and 103 contain the switching apparatus for providing telephone service to customer stations 105 and 106, respectively, and data service to data set 136 and graphics unit 127. Also connected to central office 103 is teleconference operator position 137. Connected to switching system 102 is a network services complex 100 for providing special services such as audio/data conferencing.

Network services complex 100 includes NSC processor 101, data store system 125, input/output controller 130, audio-bridge system 128, data bridge system 135, a plurality of tone receivers such as 138, and other units. As will be described in more detail below, one of the functions of complex 100 is to provide audio/data conferencing with announcements and instructions to customers over the telephone network via the toll and local switching offices.

Toll switching system 102, as depicted in FIG. 1, is a typical electronic switching system, such as, the system described in detail in the *Bell System Technical Journal*, Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 is connected to the toll office over the digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 provides the scan, distribute and digit reception tasks for analog trunks, signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. A typical processor suitable for use in the illustrative toll switching system is described in the *Bell System Technical Journal*, Vol. 56, No. 2, February 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal*, Vol. 57, No. 2, dated February 1978, and is represented herein by CCIS blocks 123 and 126 and data link 132.

Coupled to the toll switching system is the network services complex 100 comprising a main processor system including NSC processor 101 and input/output controller 130, a data bridge system 135, an audiobridge system 128, CCIS terminal 126, DS-1 interface 129, time slot interchange 124, data store announcement system 125 and a plurality of tone receivers, such as 138. Network services complex 100 can also include other units such as additional audio conferencing bridges, speech recognition systems, data processing units, etc.

The network services complex is disclosed in the copending application of D. E. Herr, R. Metz, L. E. Suk, P. R. Wiley and D. F. Winchell, Ser. No. 382,602, filed May 27, 1982, and the reader is directed to that disclosure for a more detailed description of the network services complex. In order to appreciate how the present invention is utilized in a system such as the network services complex, a brief overview of the complex and its various subsystems will be given herein, but it will be obvious to one skilled in the art that the present invention is equally applicable to other systems without departing from the spirit and scope of the invention.

It is intended that network services complex 100 function with many different types of switching systems to provide several special services in addition to those mentioned above. As such, complex 100 has been designed to connect to a switching system via conventional interoffice trunks 131 and a CCIS type data link 132. The interoffice trunks 131 serving complex 100 are digital facilities similar to the trunks between toll office 102 and local office 103 as described above and the data link 132 and its terminals are similar to those described in the 1978 *Bell System Technical Journal* cited above. Although these terminals are referred to as CCIS terminals, it is not essential that they be integrated in the CCIS signaling system used for call processing in the network.

The network services complex is modularly designed to allow for various service units to be added. All units are interconnected over a data bus 133 and a control bus 134. The control bus is used by the NSC processor 101 to communicate control, status and error information with the various units in the complex. Program associated data, billing data, etc., which is distinguished from customer data to be conferenced, is also transmitted over control bus 134. Data bus 133 consists of a transmit bus and a receive bus and each bus is a 256 time slot, time-multiplexed PCM data bus.

Interface 129 connects the T1 trunks from toll switching system 102 to time slot interchange unit 124 which under the direction of processor 101 switches any time slot in the receive T1 bus or the transmit portion of data bus 133 with any time slot on the T1 transmit bus or the receive portion of data bus 133. Thus, the interface 129, time slot interchange 124, and bus 133 provide the path for the exchange of voice, data, announcements and inband signaling between the toll switching system 102 and units of the network services complex.

The network services complex 100 is controlled by NSC processor 101 which performs or initiates all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For purposes of illustration, let it be assumed that the complex is equipped for dial-up audio/data conferencing with voice prompting. Accordingly, the complex comprises an audiobridge system 128 which is used for combining the digital voice samples of speakers on a conference for distribution to other participants of the conference. Data bridge system 135, on the other hand, receives data from each conferee's data terminal and distributes the data to the other conferees at the correct speed, in the proper format, etc. The term, data, when used with respect to information transmitted by a customer, is meant to include digital representations of video signals, facsimile, signals from devices such as electronic chalk boards, etc., which is separate from the voice and tone signals transmitted by the customer.

Network services complex 100 also includes a data store system 125 for furnishing tones and announcements to instruct the customers in the use of the special services, and a tone receiver 138 which receives the tone signals representing digits generated by the customer in establishing and controlling a conference.

The control interface between the network services complex systems and the toll switching system 102 is via a main processor system including NSC processor 101, input/output controller 130, and terminal 126. It is via this path that orders are exchanged between the network services complex and the toll switching system.

DS-1 interface 129 in this embodiment provides an interface for up to five T1 trunks (120 channels or time slots) which terminate on time slot interchange unit 124. The time slot interchange unit in turn, functions to switch these circuits with 256 time slots on time multiplexed data bus 133 to interconnect the channels with the various service units in network services complex. Thus, voice, data, and signaling information incoming over the toll telephone network from a conferee is forwarded via interface 129, and time slot interchange 124 to the audio and data bridges for conferencing or to the tone receiver for digit detection and collection while announcements and tones from data store system 125 and conference data from the bridges are transmitted back via the time slot interchange over the toll network to the conferees.

Conference calls are established by using a conventional telephone station and dialing a special conference code assigned to the conferencing service. To facilitate end-to-end signaling, it will be assumed that the customer station is equipped with a keyset for generating dual-tone multifrequency signals.

The telephone call is handled in the usual manner through the network and routed according to the dialed digits to the nearest toll switching system equipped for conferencing, such as system 102. Toll switching system 102 accesses the network services complex by transmitting a message over data link 132 to terminal 126 and ascertains if conferencing facilities are available. If facilities are available, the call is handed off to the network services complex by extending the conference originator's talking path via a channel in T1 carrier link 131, time slot interchange 124 and over the time multiplexed data bus.

Recognizing a request for a conference, NSC processor 101 requests an identification of the calling line and transmits an order over bus 134 to data store system 125 ordering a particular message prompt to be played to the customer. This prompt would advise the customer that he/she is connected to a conference facility and request the customer to dial certain codes to indicate whether this is an audio only, data only, or a combined audio/data conference. The prompt would also ask the originator how many parties will be included in the conference.

Data store system 125 responds to the order from processor 101 by loading the appropriate messages in a playback buffer and transmitting the messages over the time multiplexed data bus 133 and time slot interchange 124 to the conference originator. Processor 101 also causes a tone receiver 138 to be connected in a different time slot over the time multiplexed data bus to the conference originator. The receiver monitors the originator's line for the reception of tones from the caller.

The customer now dials (keys in) the codes satisfying the requirements for his/her conference. Tone receiver 138 detects each digit and forwards it to processor 101. Assuming that this is a combined audio/data conference, processor 101 reserves audio ports in bridge system 128, data ports in bridge system 135, and then sends an order to the data store system 125 causing the next message prompt to be transmitted to the originator.

This prompt will tell the conference originator the code that should be dialed, followed by the telephone number of the conferee to be added to the conference. As each telephone number is received via the tone receiver 138 and forwarded to processor 101, processor 101 initiates a call over its data link 132 to toll switching system 102 requesting that the toll switching system establish a call to the designated conferee and connect that conferee to a channel selected in T1 link 131.

As each leg is established under the direction of processor 101 and the called conferee answers, the conference originator can converse privately with the conferee announcing that he/she is about to be added to the conference. Similar legs are established from data bridge system 135 to the data terminals of each conferee.

DETAILED DESCRIPTION

The invention can better be understood by a more detailed description of each of the major elements of the apparatus as shown in FIGS. 2-11 followed by a description of the sequence of operation of the equipment with respect to the flow diagrams in FIGS. 12-29.

1. Main Processor System

Figure 11:
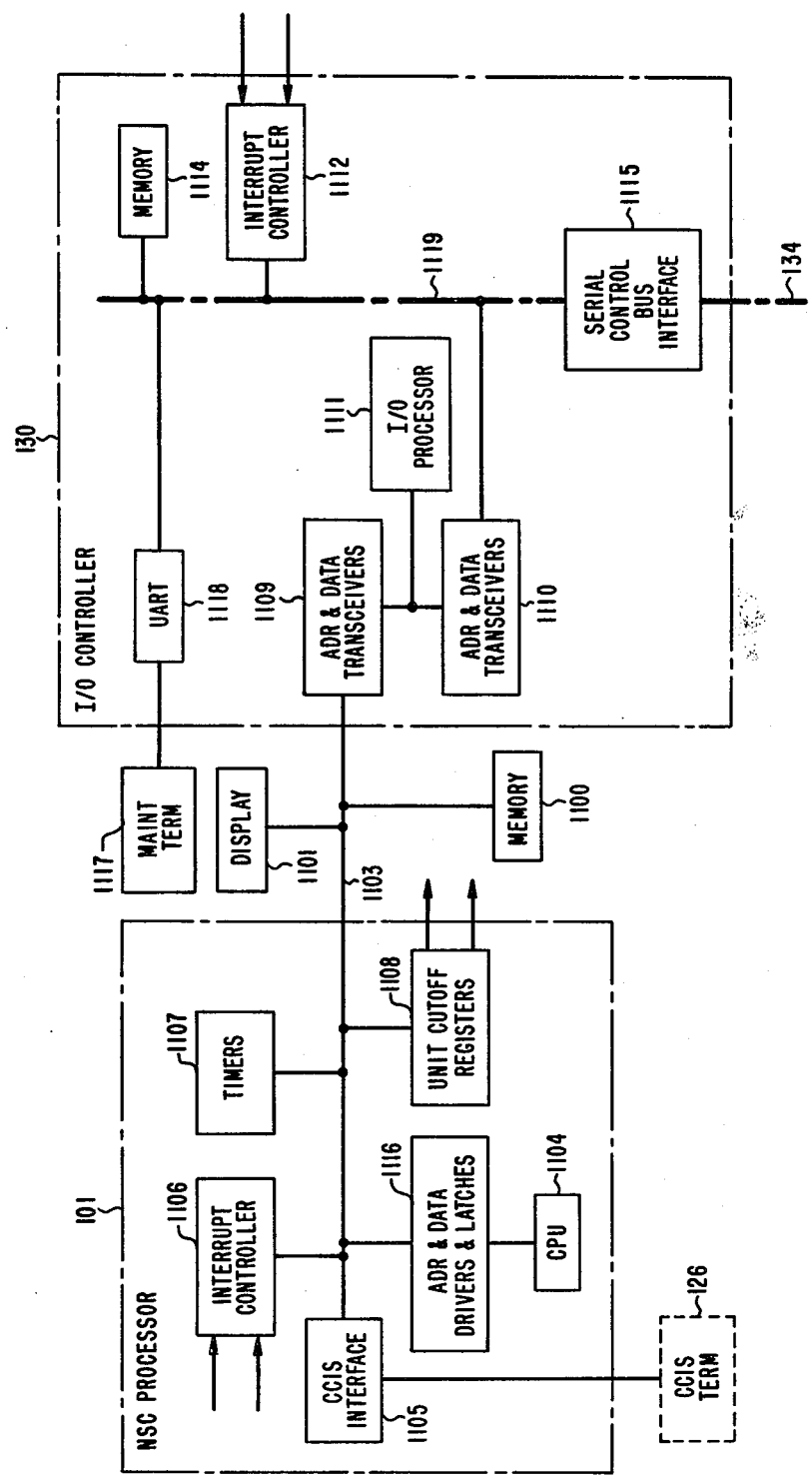
FIG. 11 shows the main processor system of the network services complex.
Figure 12:
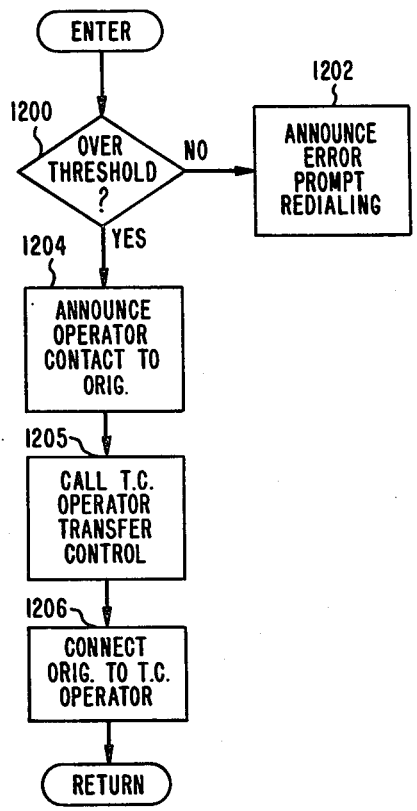
FIGS. 12–20 show a flow diagram of the overall operation of the system with respect to call processing.
Figure 13:
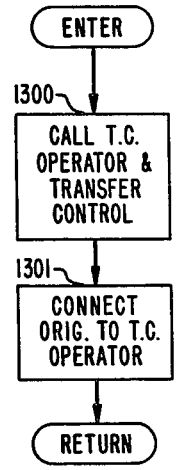
Figure 14:
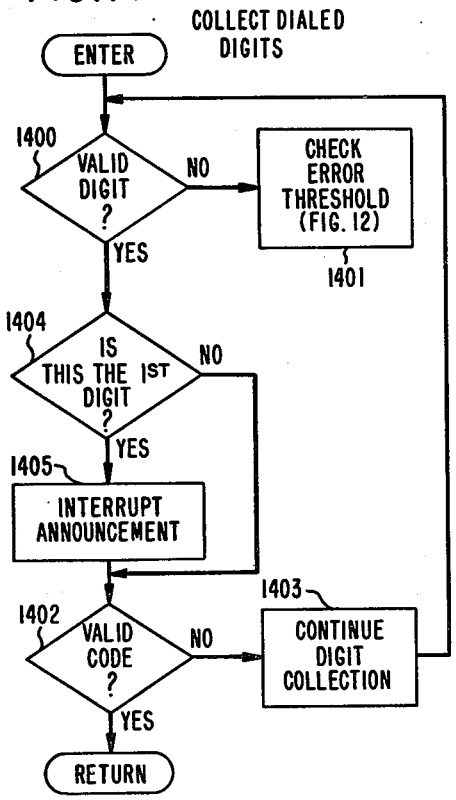
Figure 21:
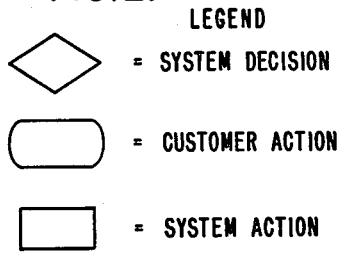
FIG. 21 shows the legend of the symbols used in the flow diagrams.

The main processor system for the network services complex is shown in more detail in FIG. 11. The main processor system comprises NSC processor 101, memory 1100, input/output controller 130, and display 1101 which are interconnected over system bus 1103. The main processor system is a distributed processor which is responsible for all call processing, maintenance, fault recovery, certain diagnostics and audits for the network services complex as a whole. The main processor system also keeps track of all system resources such as what ports are assigned to a particular conference, the status of all ports and receivers, the identification of available announcements, etc.

Communication with the toll switching system 102 is via terminal 126 which accesses processor 101 via a direct memory access channel, and processor 101 distributes orders to and receives replies from the peripheral service units (such as the data bridge, the audio bridge, etc.) via input/output controller 130 which acts as a direct memory access controller for the processor. Using a shared area of memory 1100, controller 130 transfers messages between the peripheral service units and processor 101.

The units within the main processor system communicate via system bus 1103 in a master-slave relationship. Central processing unit (CPU) 1104, I/O processor 1110, and a memory refresh controller (not shown), act as masters with the other units acting as slaves. Contention between bus masters is resolved by a bus arbiter arrangement in a well-known manner.

The NSC processor 101 comprises CPU 1104, interrupt controller 1106, interface 1105, timer 1107, and unit cut-off registers 1108.

Interrupt controller 1106 responds to signals from equipment such as timer 1107 and controller 130. It will be noted that CCIS interface 1105 resides on the system bus to permit any master on the bus to access a random access memory (RAM) which resides in the terminal 126.

As mentioned above, the serial control bus 134 interconnects the main processor system with the peripheral service units for control information and time multiplexed data bus 133 interconnects the units for data flow. These units can be disabled and forced off the bus by unit cut-off registers 1108 under the direction of CPU 1104.

The input/output controller 130 acts as a direct memory access controller for memory 1100 and all service unit operations. In addition, it permits maintenance personnel to access the system via a maintenance terminal 1117. I/O processor 1111 accesses its own resident bus 1119 via address and data transceivers 1110, and it accesses the system bus 1103 via address and data transceivers 1109.

I/O processor 1111 has its own memory 1114 for program storage and its own interrupt controller 1112. It is via interrupt controller 1112 that the peripheral units such as the audio bridge, data bridge, etc., gain access to main processor system of the network services complex.

All communication of the control information between the main processor system and the other units of the complex is via serial control bus interface 1115 and control bus 134. The main processor system acts as a master on the control bus with the audio bridge system, data bridge system, data store system, tone receivers, time slot interchange unit, etc., acting as slaves. Messages from the main processor system are formatted with a destination address of the peripheral system to which the message is directed, followed by an operation code which specifies the function of the message and a data field containing the contents of the message. If a peripheral unit such as the data bridge wishes to utilize the control bus 134, it signals over a dedicated interrupt lead to interrupt controller 1112, and the main processor system can grant control of the bus with the next message it sends over the bus.

2. Data Store System

As mentioned above, data store 125 is provided to furnish tones and announcements over the telephone network to instruct customers in the use of the special services furnished by the network services complex. In general, data store 125 receives requests for announcements in the form of orders from NSC processor 101 over control bus 134, acknowledges the requests and plays the announcement back over bus 133 in a time slot designated by processor 101.

The apparatus of data store 125, which will now be described in general terms, is more fully disclosed in FIG. 5, in the copending application of T. W. Anderson, R. J. Milczavck, and C. H. Peters, Ser. No. 380,511, filed May 21, 1982 and in the above-identified application of D. E. Herr et al., the reader is directed to these disclosures for a more detailed description of a data store suitable for use in the present invention.

Figure 5:
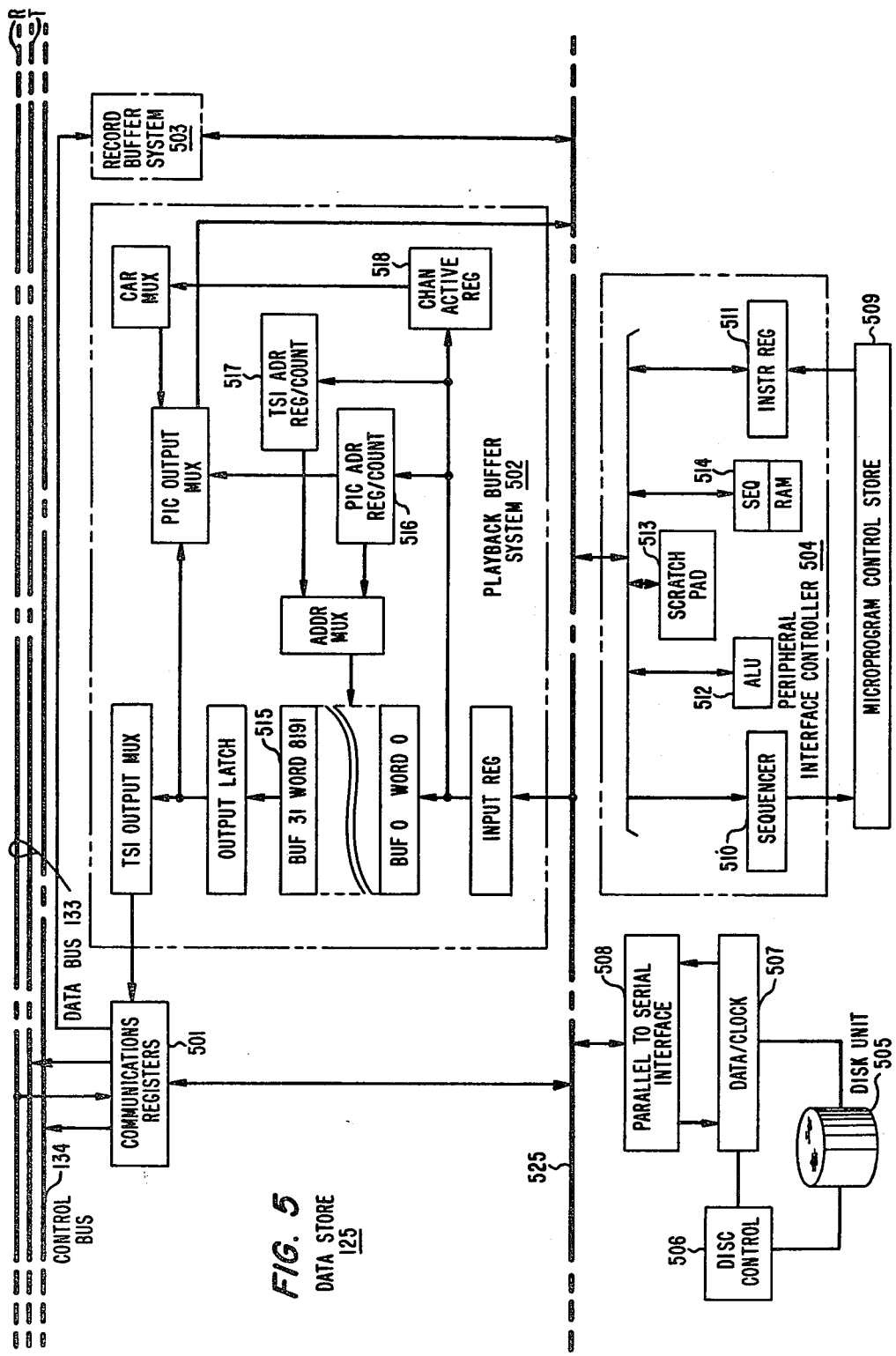
FIG. 5 shows a more detailed block diagram of the data store used for generating tones and for storing announcements for the network services complex.

As shown in FIG. 5, data store 125 is a processor controlled facility comprising a plurality of communication registers 501, playback and record buffer systems 502 and 503, peripheral interface controller 504 and disc unit 505 with its associated control, data/clock and parallel/serial interface units 506–508. Audio information transmitted from time slot interchange 124 (shown in FIG. 1) via 8-bit serial/parallel multiplexed bus 133R is received in record buffer system 503 in encoded PCM format. Similarly, audio information, such as tones and announcements, are played back via playback buffer system 502 and transmit bus 133T to time slot interchange 124.

Orders received from NSC processor 101 and replies generated by peripheral interface controller 504 are transmitted over control bus 134.

Orders for the play-back of various messages which are stored in disc unit 505 are executed by reading from sectors of the disc 505 into a plurality of the playback buffers of the playback buffer system. In this embodiment, each playback buffer can contain up to two seconds of information for each playback channel and the data store as a whole can accommodate up to 32 channels of play back, with seven of these allocated to playing repetitively, two-second announcements and signals such as a tone. The 32nd channel is used for internal maintenance.

Each playback channel of the data store will be assigned a time slot on bus 133T and of course, a plurality of data stores, such as 125, can be added to the bus to increase the overall voice storage and playback channel capacity of the network services complex.

In playing back announcements which are used to prompt the customer in the use of the network services complex, the main processor system sends an order over control bus 134 requesting a particular announcement be played in a particular time slot on time multiplex data bus 133. At the same time, processor 101 causes the information on that time slot to be transmitted via TSI 124 over a time slot associated with the originator, to each of the conferees or to whoever is to receive the announcement.

In response to an order from processor 101, data store functions autonomously to load the proper announcements from disc unit 505 into the playback buffer associated with the time slot designated by processor 101 and peripheral interface controller 504 reports back to NSC processor 101 that the announcement has been played back as ordered.

While the term "announcement" has been used herein with respect to data store 125, it will be understood that the data store can also have various tones stored therein for playback over the network.

3. Audio Bridge System

Figure 2:
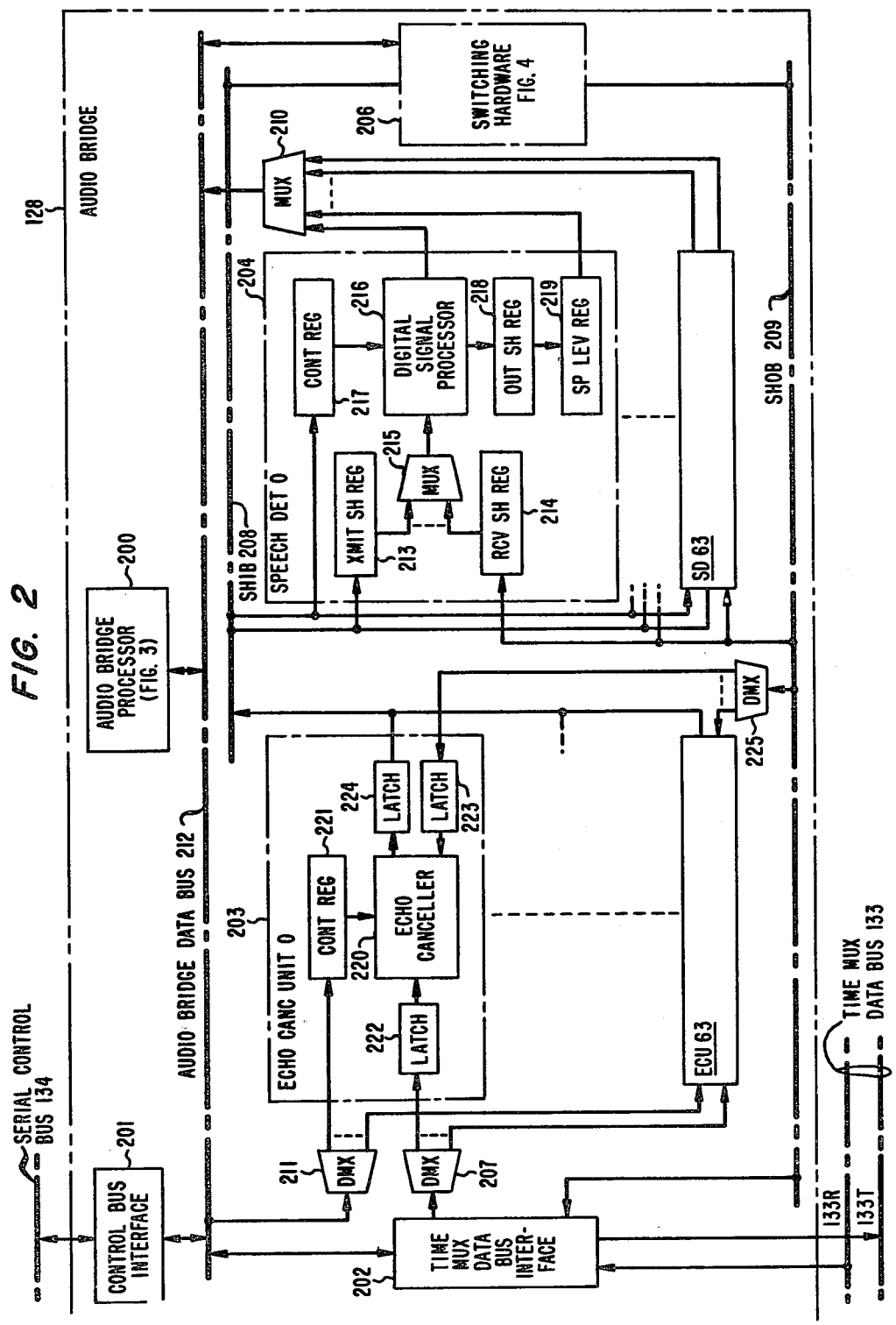
FIGS. 2–4 show a more detailed block diagram of the audio-bridge portion of the network services complex, with FIG. 3 showing the audio-bridge processor and FIG. 4 showing the audio-bridge switching hardware.
Figure 3:
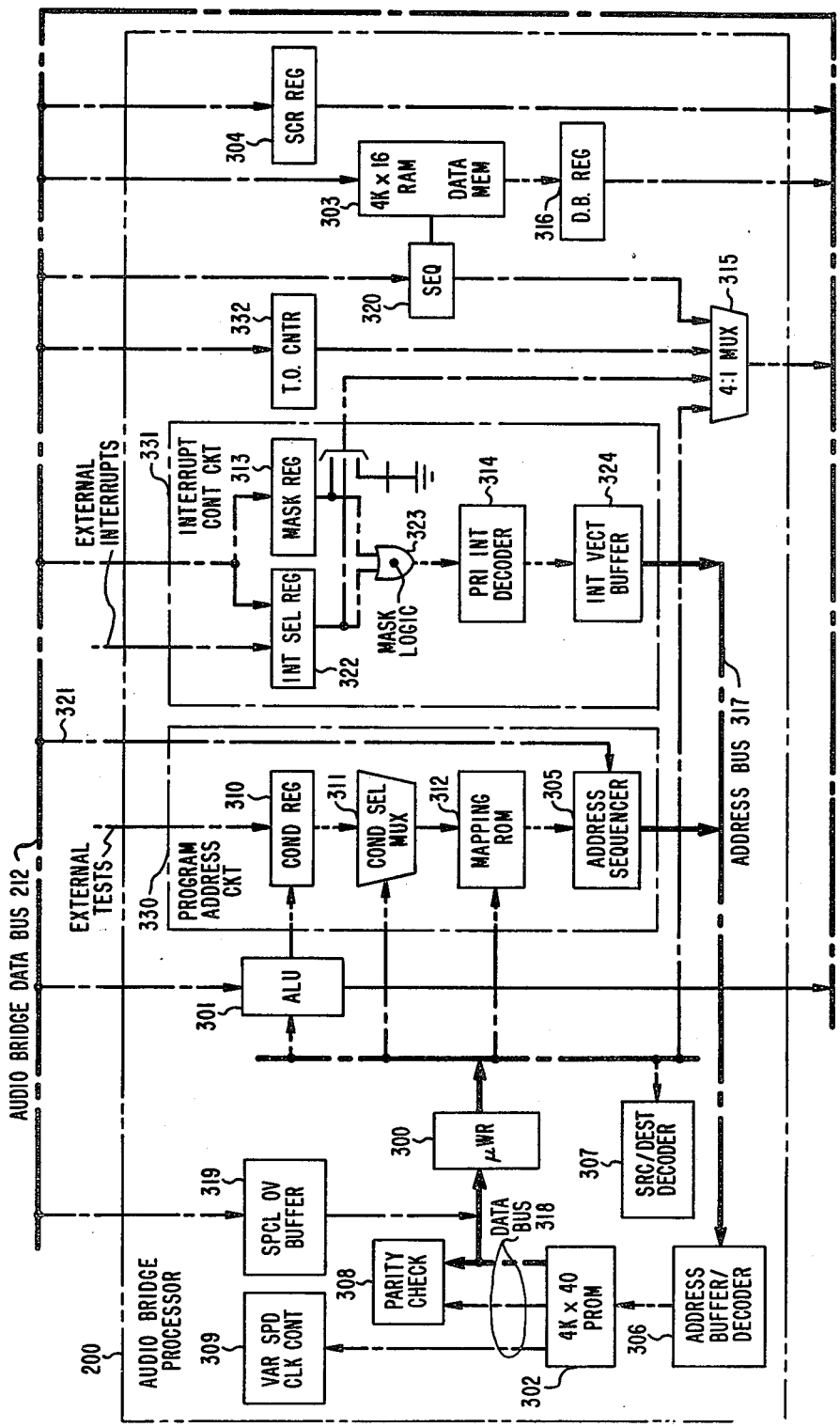
Figure 4:
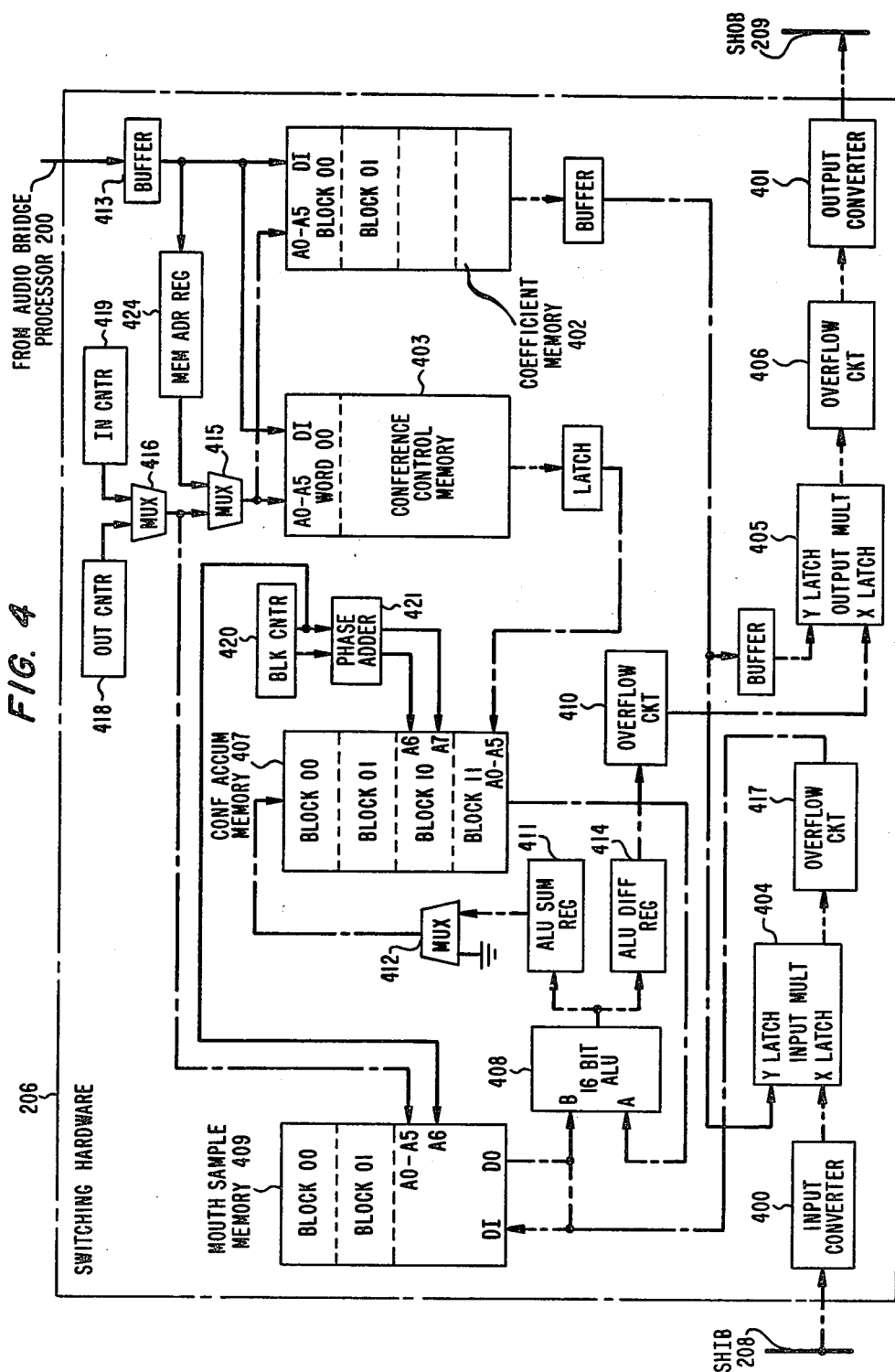

The audio bridge conference system is a multiport digital conference arrangement and is illustrated in more detail in the block diagram of FIGS. 2–4. As shown in FIG. 2 the conference arrangement comprises an audio bridge processor 200, bus interfaces 201 and 202, a plurality of echo canceler units such as 203, a plurality of speech detectors such as 204, and switching hardware 206. A speech detector and an echo canceler are provided on a per-port basis to detect and measure the level of speech and to control the amount of echo, respectively. During each time frame, each port is monitored for information (speech) samples above a threshold level. Upon detecting a threshold level sample, the speech detector for that port generates two control signals. One is speech/no-speech indication which designates the port as having a threshold level sample and the other is a speech level estimate which is used for port selection and automatic level control. The audio bridge processor scans the speech detectors for these signals once each base cycle of operation to direct the switching hardware to include in the output sample only input samples from selected, designated ports. With one conferee speaking, only the input sample from that speaker is included in the output sample. With more than one conferee speaking simultaneously, the switching hardware sums the input sample from each speaker together to form the output sample.

Communication within the audio bridge between the audio bridge processor and other units is via audio bridge data bus 212. The audio bridge communicates with the rest of the network services complex, and therefore, the telephone network via serial control bus 134 and time multiplexed data bus 133. It is over serial control bus 134 that the audio bridge receives orders from and sends replies to NSC processor 101 for establishing and controlling conferences. Time-multiplexed data bus 133, on the other hand, comprises a transmit and a receive leg for handling the samples of speech to be summed and distributed for each conference.

Audio bridge processor 200 (shown in more detail in FIG. 3) performs all common arithmetic, logic, and sequence control operations and also controls the status of the conference by writing control information into the switching hardware control memory shown in FIG. 4.

Switching hardware 206 shown in more detail in FIG. 4, performs three major functions in the conference arrangement, namely, it sums the speech samples from the time slots (ports, channels) into their respective conferences to form an output sample for each conferee, implements noise and automatic level control on incoming speech samples, and implements echo control by switching loss into the speakers receive path when echo cancelers are not effective. The audio bridge processor 200 controls these functions by writing the coefficient memory of the switching hardware with appropriate coefficients.

Having described the bridge hardware, a brief description of the flow of speech samples through the bridge is in order. During each time frame, 64 time slots of PCM data enter the audio bridge via time-multiplexed data bus 133. Speech samples are first sent to an echo canceler such as 203 where various degrees of echo suppression may be performed and then to the switching hardware which sums the incoming speech samples and distributes the resulting combination to each port in a conference.

A speech detector for each of the 64 ports (i.e., time slots, channels) monitors the speech samples going into the switching hardware and generates a speech/no-speech (busy/idle) indication and a speech level estimate. An 8-bit number in a speech level register such as latch 219 represents the speech level estimate or more particularly, the energy level on the port, whereas, the digital signal processor generates the speech/no-speech indication. The audio bridge processor scans each speech detector every base cycle to obtain the speech/no-speech indication and the speech level estimate. These are then used by a conference processing program to select which ports of a conference are enabled on the bridge. Samples from an enabled port are included in the resulting output sample distributed to each port of the conference. In addition, NSC processor 101 can designate certain ports as "attendant," "listener," "broadcast" and "normal." In the attendant and broadcast mode, the speech sample on that port will always be included in the summation.

For a further detailed description of the audio bridge system the reader is directed to the following copending applications in addition to those cited above: M. A. Marouf-P. Vancil, Ser. No. 382,672, filed May 27, 1982 and Bass et al., Ser. No. 437,693, filed Oct. 29, 1982. Of course it will be obvious to those skilled in the art that the present invention is suitable for use with other conference arrangements without departing from the spirit and scope of the invention.

4. Data Bridge System

Figure 6:
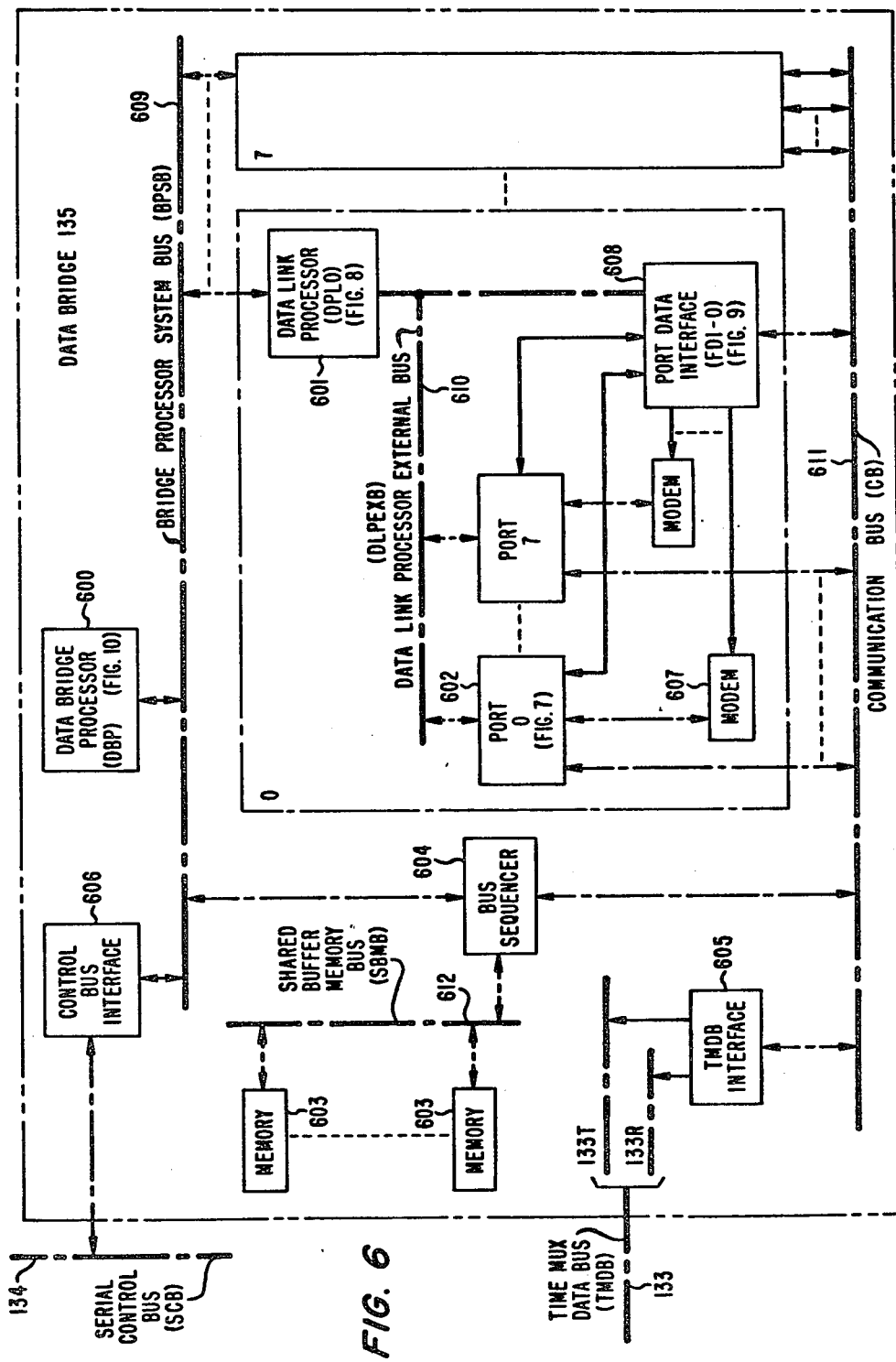
FIGS. 6–10 show the data bridge conference system of the network services complex with FIG. 7 showing a typical data port, FIG. 8 showing a typical data link processor, FIG. 9 showing the port data interface and FIG. 10 showing the data bridge processor.
Figure 7:
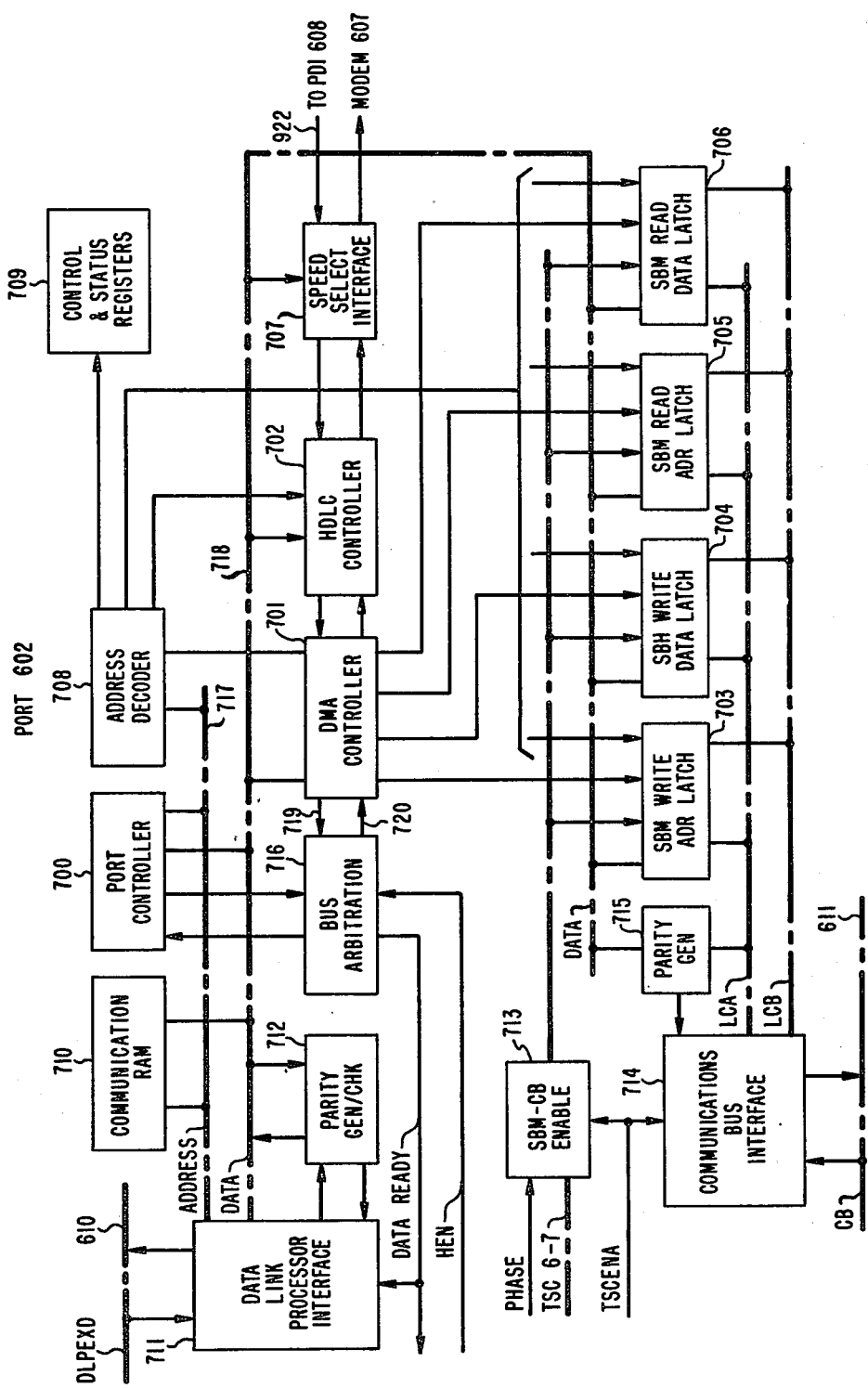

The apparatus of the data bridge is more fully disclosed in FIG. 6. As shown in FIG. 6, the data bridge 135 comprises data bridge processor 600, a plurality of data link processors, such as 601, a shared buffer memory 603 and a bus sequencer 604. Associated with each data link processor is a port data interface, such as 608 and a plurality of ports, such as 602. In this illustrative embodiment, eight data link processors are provided in the data bridge and each data link processor is equipped to serve eight ports for a total of 64 ports per data bridge.

The data bridge interfaces with the network services complex via two buses, namely, the serial control bus 134 which handles the control functions and the time multiplexed data bus 133 which handles the data functions.

For illustrative purposes, it has been assumed that customers using the data bridge will communicate over the network trunks using at least two different modes of communication. Thus, some customers will use trunks that provide a 4.8 Kb/sec half-duplex connection while other customers will use trunks that provide a full-duplex connection at a 56 Kb/sec data rate.

Figure 10:
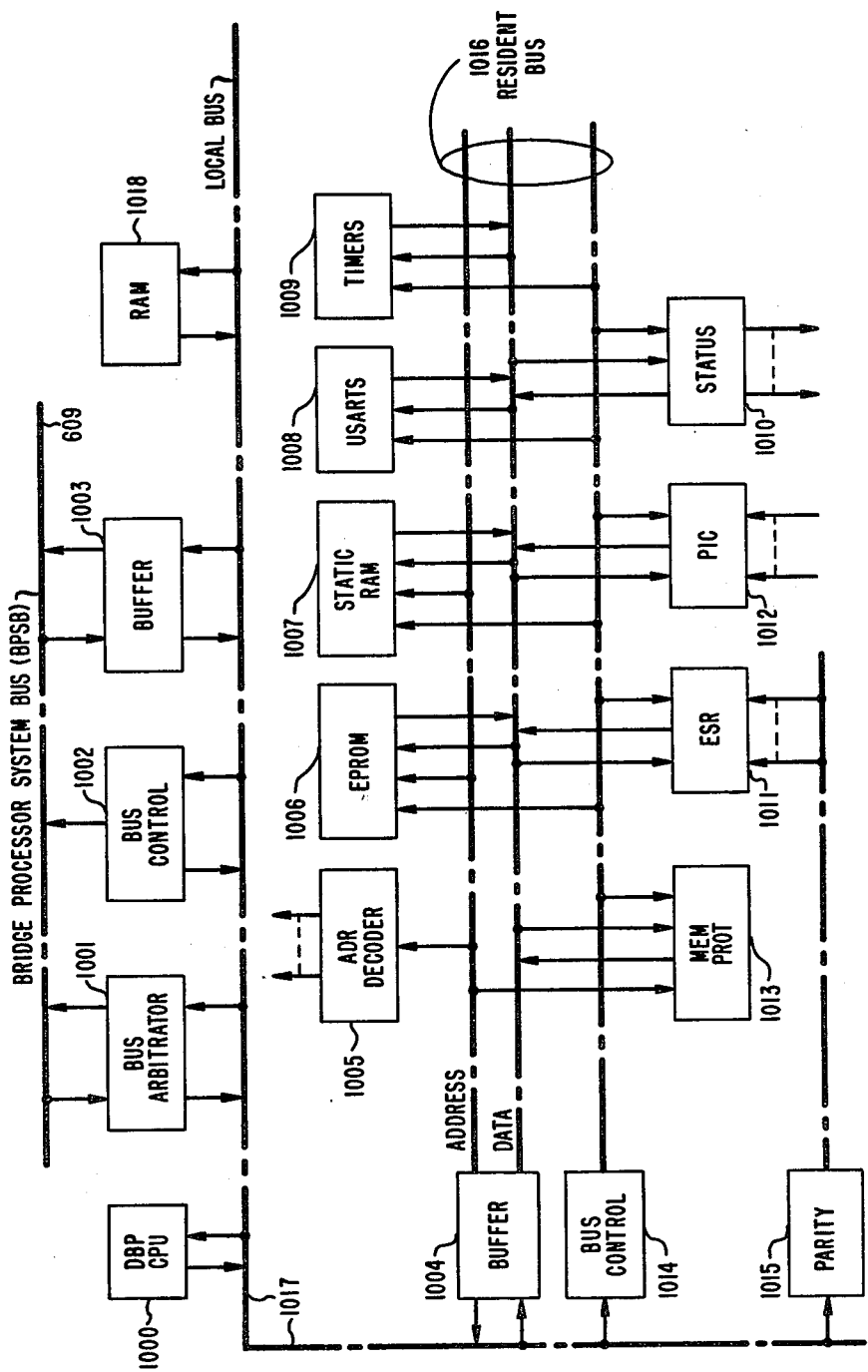

The data bridge processor 600 which is also shown in more detail in FIG. 10 is the main control processor. It interfaces with NSC processor 101 via serial control bus 134 from which it receives conference configuration information and to which it reports conference status. Data bridge processor 600 is connected to the shared buffer memory 603 via the bridge processor system bus 609 and bus sequencer 604. It is from the shared buffer memory 603 that the data bridge processor 600 obtains session and document protocol data. Data bridge processor 600 can also access the various data link processors via bus 609 to control port configuration and monitor the port status.

Figure 8:
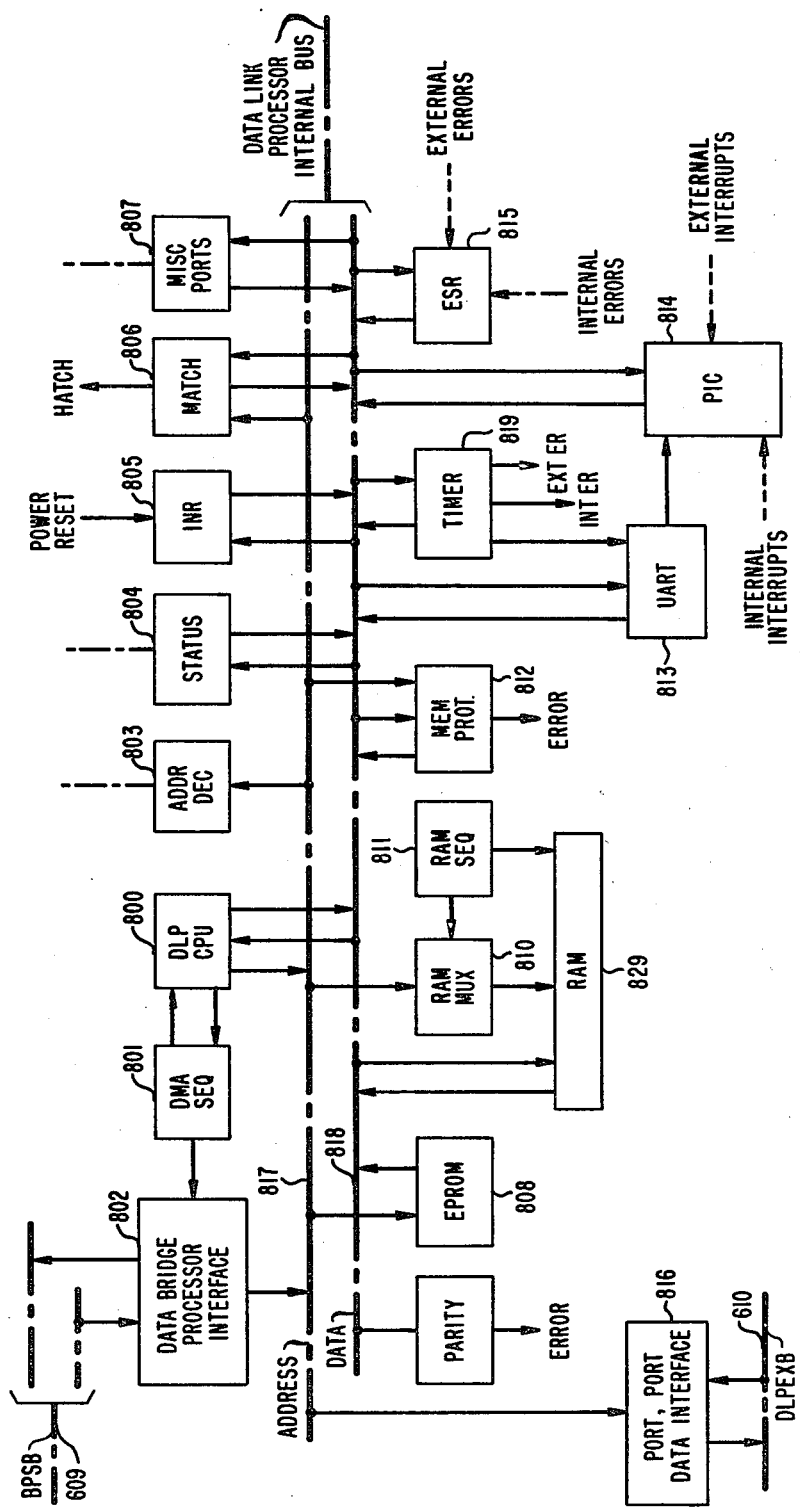

Each data link processor which is also shown in more detail in FIG. 8 interfaces with eight high-level data link control ports, such as port 602, to control the port configuration as commanded by data bridge processor 600. The data link processors also handle all link-level protocol procedures except synchronization, cyclic redundancy checking and bit insertion.

The ports, such as port 602, handle actual frame transmission and reception. The ports interface with a port data interface such as 608 from which they receive 56 Kb/sec serial data and they interface with a modem such as modem 207 from which they receive 4.8 Kb/sec serial data. The ports can also interface directly with the shared buffer memory on a time-shared basis via communications bus 611 to read out of the memory information to be transmitted over the network to a conferee or write into the memory data received from a conferee as directed by the associated data link processor.

Figure 9:
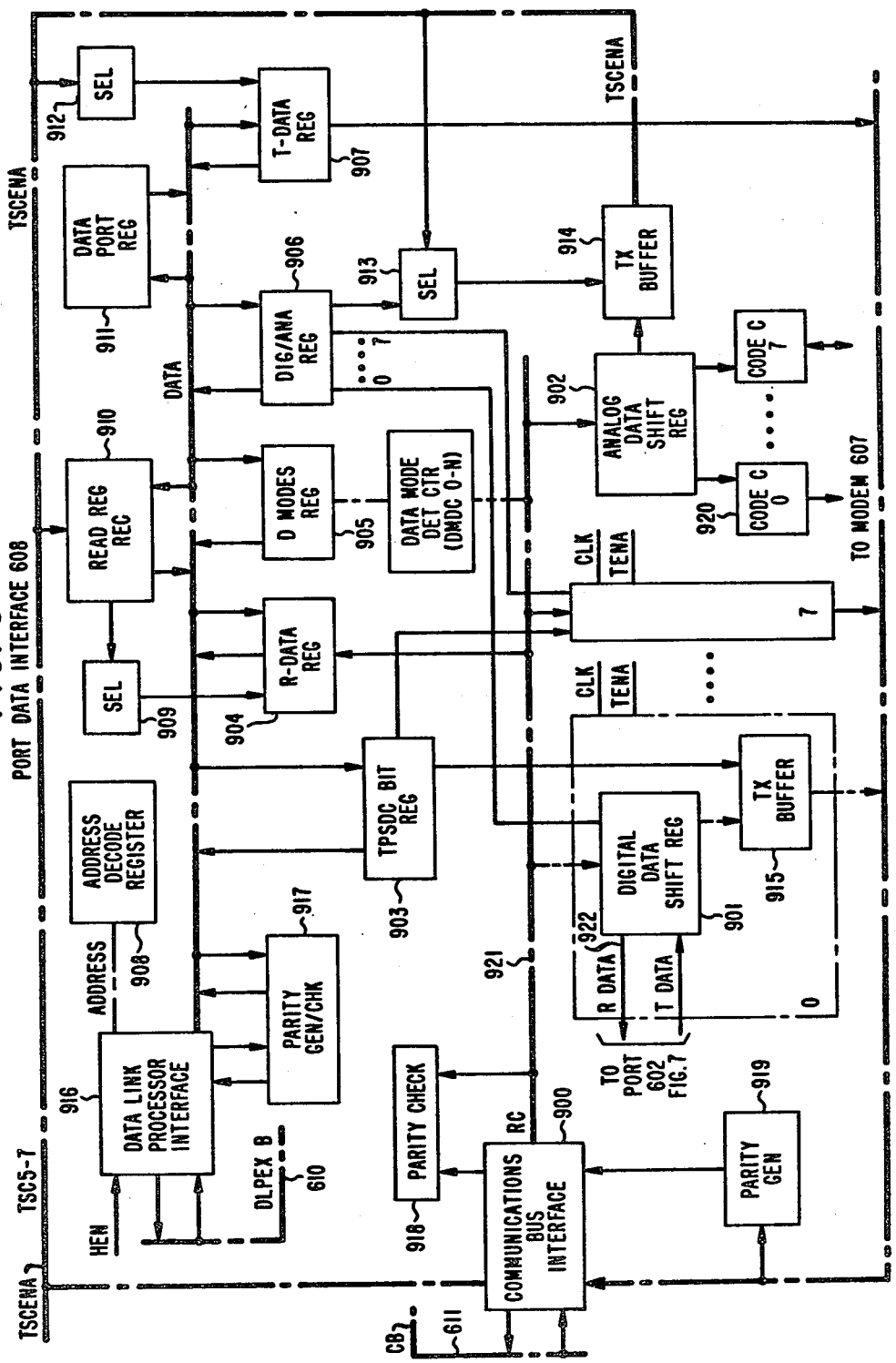

The port data interface 608 which is also shown in more detail in FIG. 9 functions with eight port units, such as port 602. The port data interface performs the function of interfacing the ports and the time multiplexed data bus for the different modes of transmission utilized by conferees. Port data interface 608 receives data from and transmits data to the network services complex time-slot interchange frame 124 (FIG. 1) via the time multiplexed data bus 133 and communication bus 611 at a 64 Kb/sec rate compatible with the standard T1 trunks at the toll switching center 102.

Thus, the data stored in the shared buffer memory after being processed by the port data interface and the port is in the same format for all conferees regardless of the data rate that the conferee terminals were using. This data can then be extracted from the shared buffer memory by any port for transmittal to any conferee at the data rate compatible with that conferee.

The port data interface 608 as shown in FIG. 9 has seven control registers which can be accessed directly by the data link processor over bus 610, and these registers control the selection of data speed conversion and the transmission of an idle code on an idle channel as dictated by the data link processor 601.

The data bridge system is disclosed herein for illustrative purposes and a more detailed description of the data bridge can be found in the above-cited D. E. Herr et al. application and in the copending application D. E. Herr-R. A. Russell-R. Metz, Ser. No. 415,254, filed Sept. 7, 1982. Other data conference arrangements can also utilize the present arrangement without departing from the spirit and scope of the invention.

5. Sequence of Operations—Audio/Data Conference Call Processing

The overall operation of the conference arrangement can best be illustrated by describing, with respect to the flow diagrams of FIGS. 12-20, the call processing sequence of events that take place when a customer originates an audio/data conference call.

Figure 15:
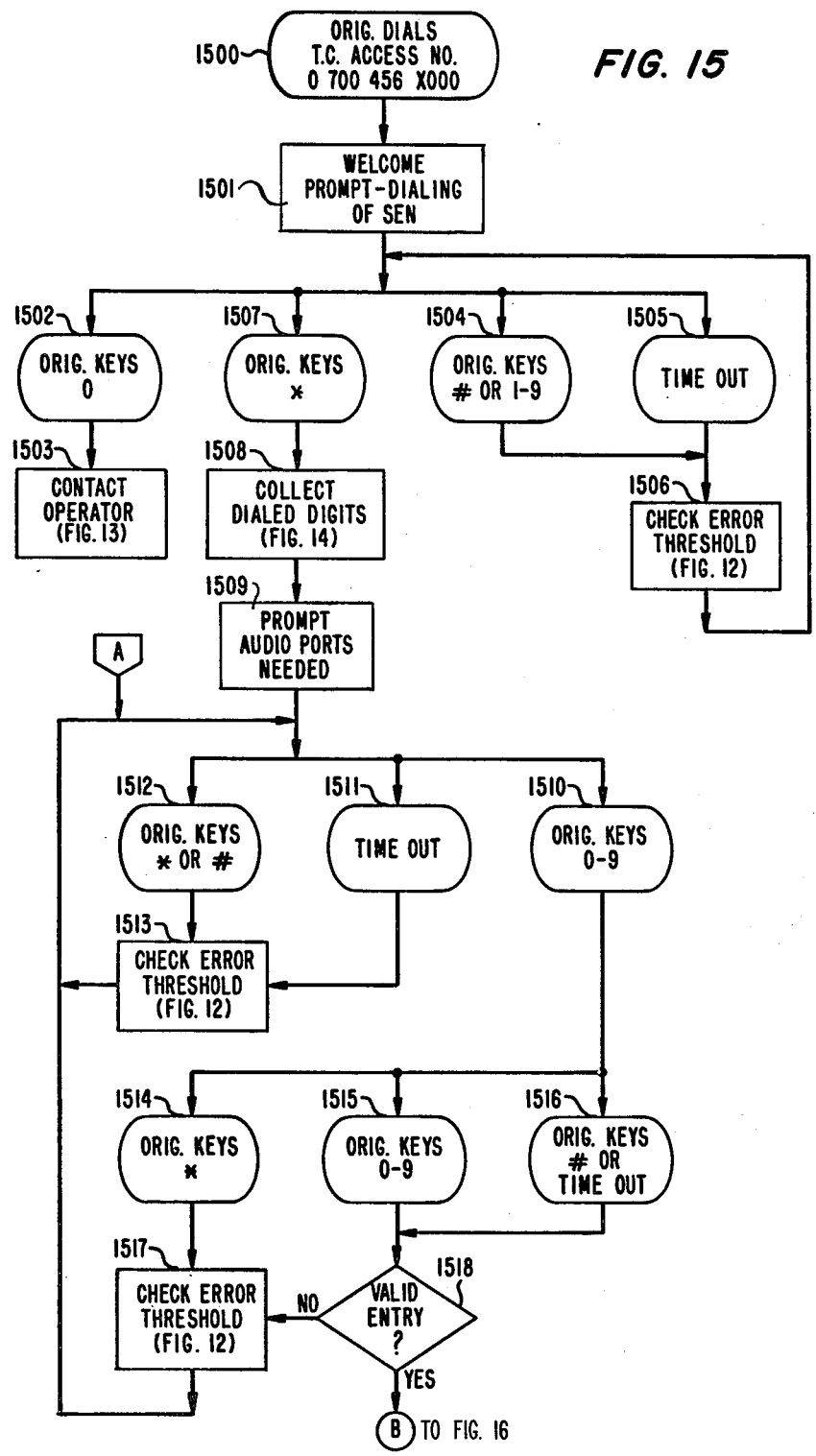
Figure 16:
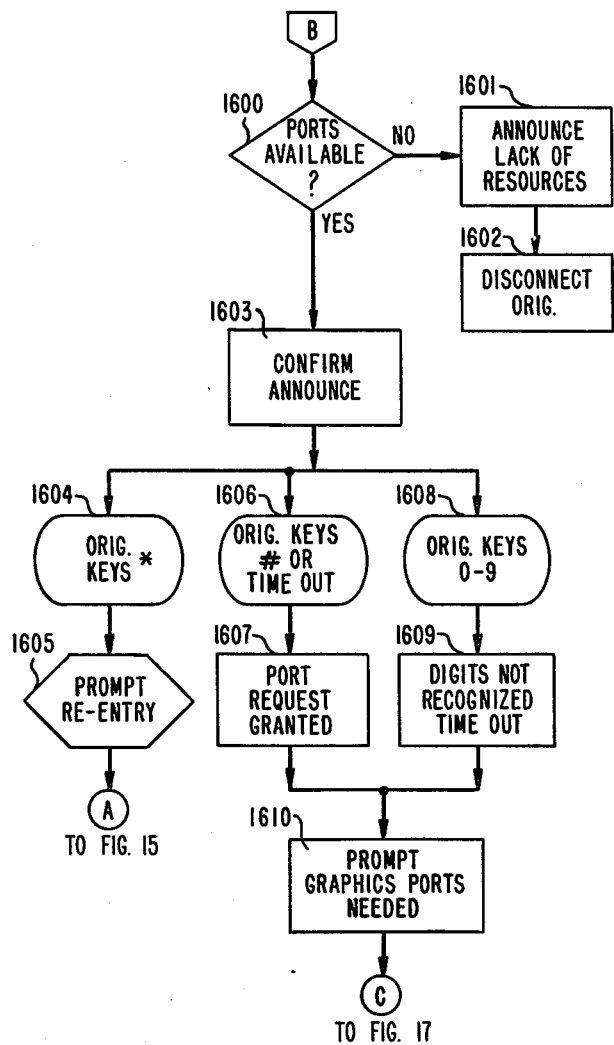
Figure 17:
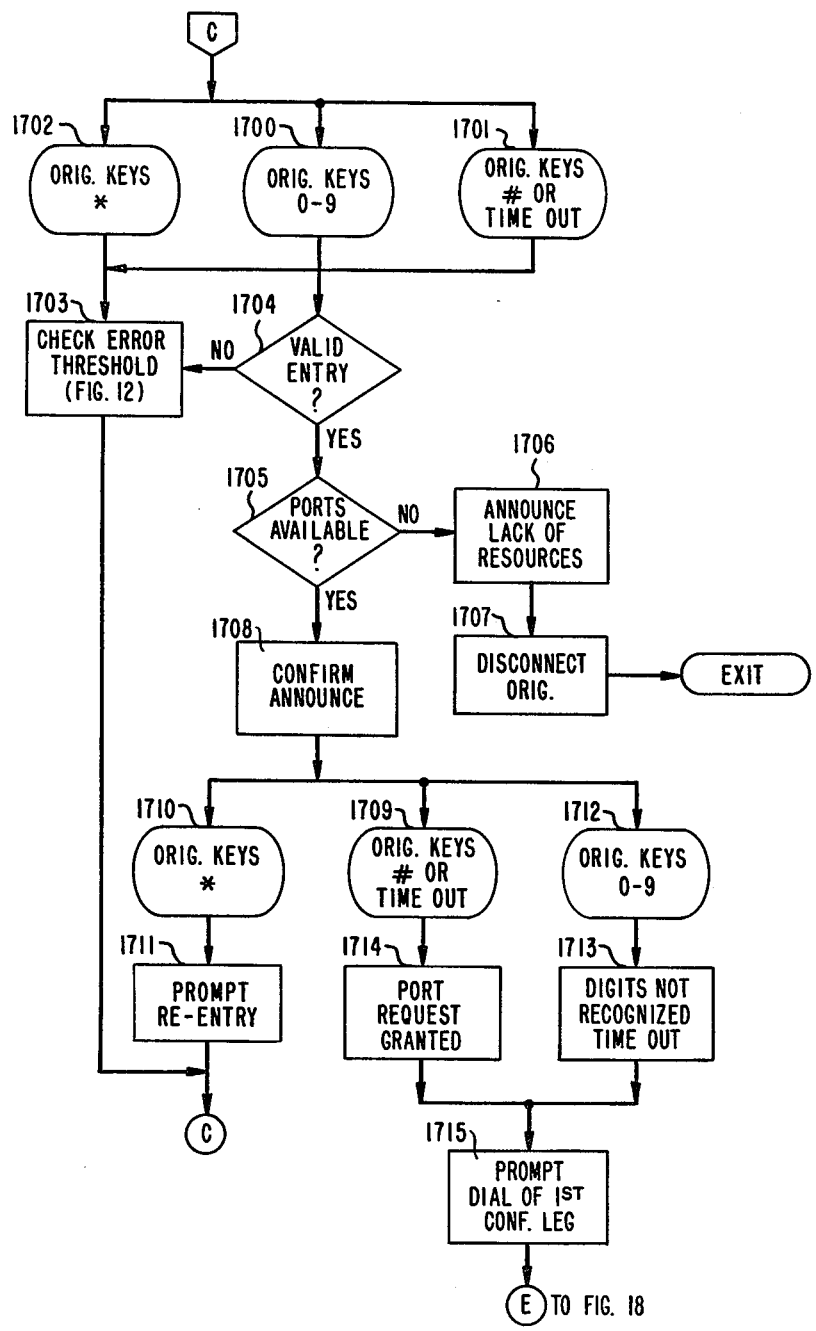
Figure 18:
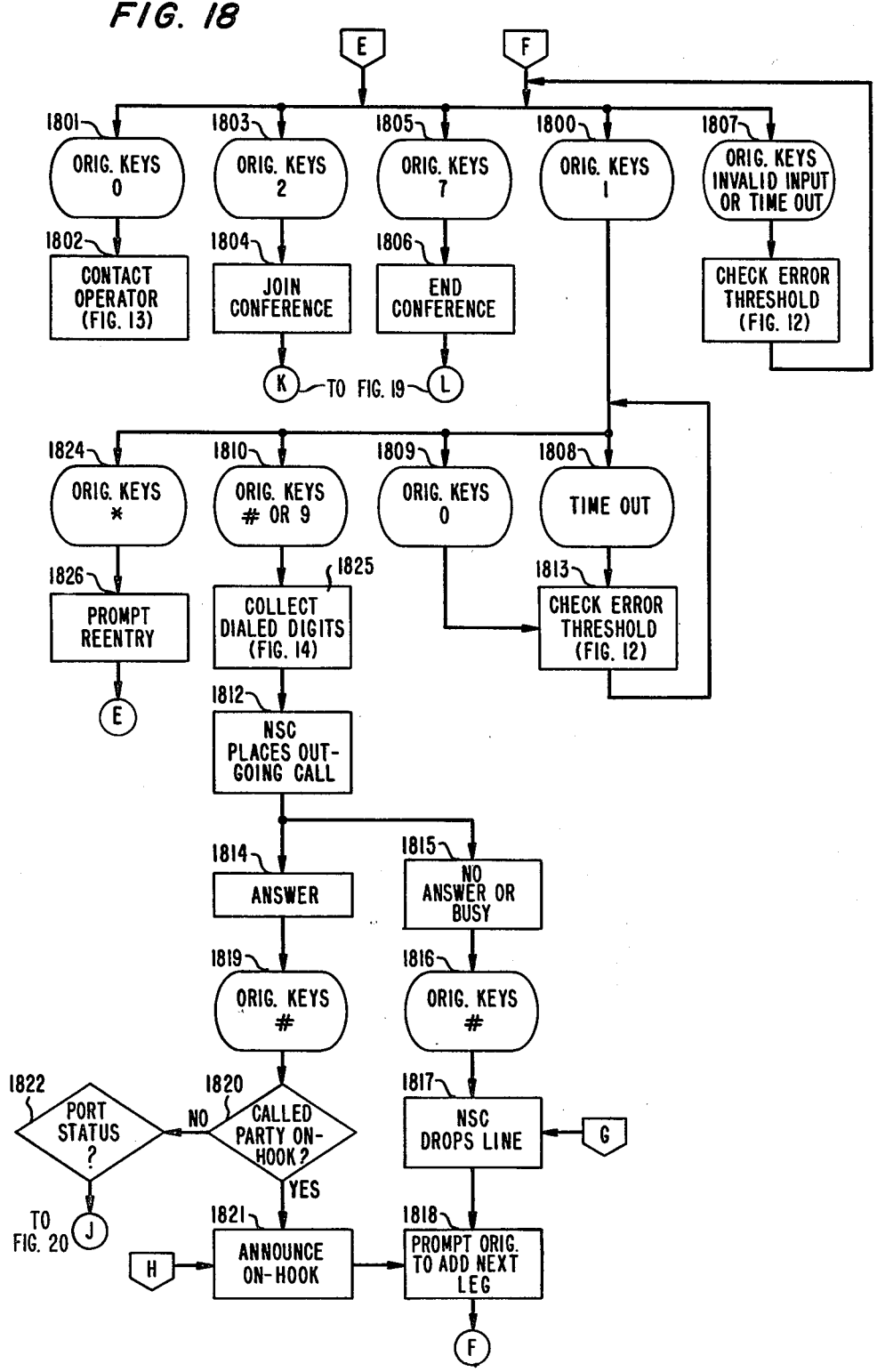
Figure 19:
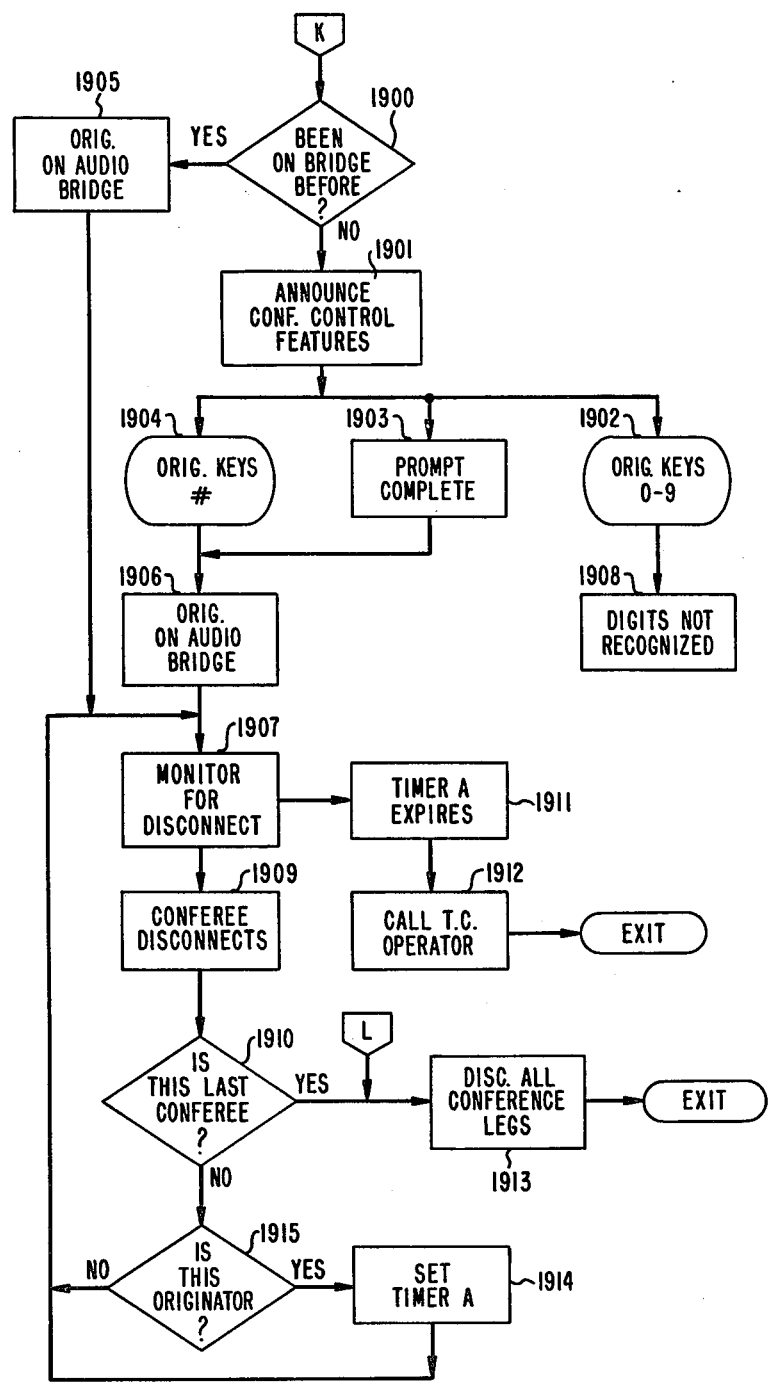
Figure 20:
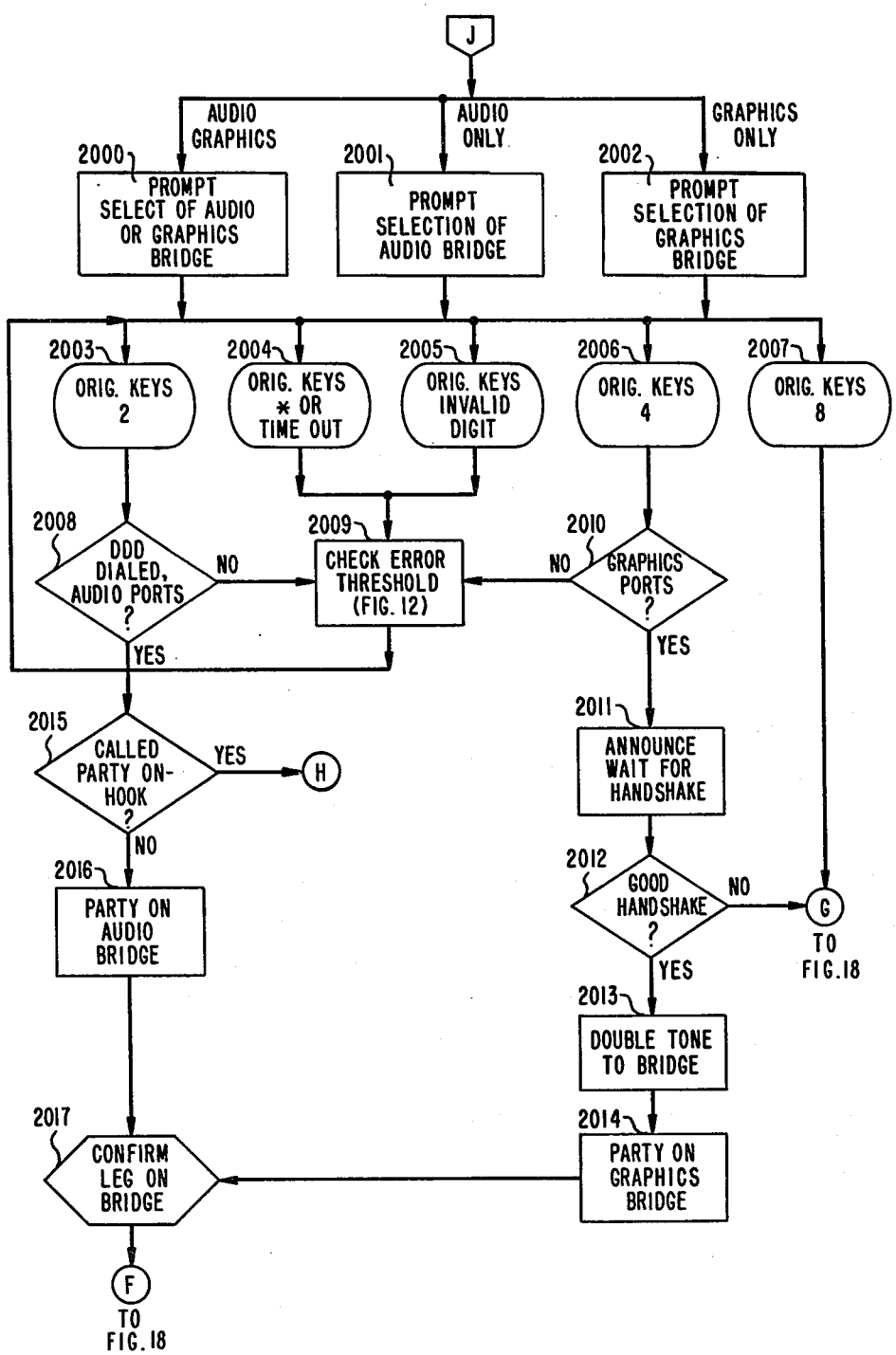

The conference originator begins by dialing into his/her local office a conference service access code of 10 or 11 digits, such as 0+700+456+X000, as shown in box 1500 of FIG. 15. The first digit might be used to route the call through a switching facility which enables the automatic identification of the calling customer for billing purposes. The next three digits provide a uniform code which identifies all special services such as those to be provided by the network services complex on a nationwide basis so that all customers within a wide geographic area utilize the same code. In the example being described, the digits 700 are used. The fifth through seventh digits (such as, "456") identify all audio/data teleconferencing services and the last four digits indicate the particular conference services. For purposes of illustration, let it be assumed that the customer wishes to originate an audio/data conference.

The call is routed via the telephone network in a conventional manner to a toll switching system having a network services complex, such as toll system 102 shown in FIG. 1. Switching system 102 selects an idle trunk in the T1 link 131 and sends an initial address message over link 132 to the network services complex indicating that conference equipment is desired.

In response to the initial address message, network services complex processor 101 ascertains if it has sufficient conference resources to provide the service. It does this by examining tables in RAM 1100 which lists all of the available facilities along with their busy/idle status. Upon determining that sufficient conference facilities are available, processor 101 sends a message to switching system 102 over link 132 indicating that it will accept the conference call and requesting that the calling line be identified. Answer supervision is also returned to the originator's office at this time. The incoming T1 trunk in link 131 which is serving the conference originator is then connected via time slot interchange 124 to a playback buffer in data store 125, and processor 101 orders the data store to transmit a welcoming message to the conference originator. Processor 101 also orders the interconnection of tone receiver 138 to the trunk incoming from the conference originator in order to receive further digits transmitted by the originator.

By connecting a tone receiver and playing announcement prompts to the originator as described above, the originator is also designated the conference "controller" and has the ability to perform certain control functions such as adding conferees, summoning an operator, transferring control to another conferee, etc. Thus, when the term "controller" is used herein, it denotes the station currently in control which may or may not be the station which originated the conference.

As mentioned above, time slot interchange 124 provides the interconnection between communication channels in link 131 and the time multiplexed data bus 133. Thus, information received on any channel (i.e., time slot) in link 131 can be transmitted to any of the channels in the same link to provide a trunk-to-trunk connection. Similarly, information in any time slot of the time multiplexed data bus can be transmitted back via another time slot on the time multiplexed data bus to interconnect service circuits of the network services complex. An example of this would be connecting a playback buffer of the data store 125 to an audio bridge port to play an announcement over the conference bridge. Also, the information in any time slot of link 131 can be transmitted via a time slot of time multiplexed data bus 133 so that customers can be connected to a tone receiver, playback buffer, conference port, etc. Furthermore, communications can be fanned out by time slot interchange 124 so that an announcement transmitted from a playback buffer in data store 125 can be selectively transmitted via several time slots in link 131 so that many customers may hear the announcement.

The systems involved in this invention are time division systems and when the terms trunk, conference port, conference leg, channel, and similar terms are used throughout the specification, it will be understood that in actuality, the reference is being made to a particular time slot in one of the time multiplexed channels.

Returning now to a description of the operation of the system, when processor 101 interconnected the originator's incoming trunk with data store 125, it ordered time slot interchange 125 to connect the incoming trunk time slot in link 131 with a time slot in multiplexed data bus 133 that is associated with a designated playback buffer in the data store. At the same time, an order was sent over serial control bus 134 to the data store causing a welcoming message designated by the order to be played to the conference originator as shown in box 1501.

The welcoming message would inform the originator that he/she has been connected to a conference service and request the originator to dial a service entry number (SEN) or a "0". Dialing a "0" as shown in box 1502 would summon an operator who would then act similar to a conference originator in setting up the conference desired by the calling customer. By dialing the service entry number, however, the customer indicates that he/she wishes to establish the conference under his or her control.

It is contemplated that different service entry numbers will be used to select various features of the system. For example, the customer may be familiar with the procedure of establishing a conference and require little or no prompting. As such, the customer would dial a service entry number denoting that abbreviated prompts can be given and that these prompts can be interrupted if the originator is familiar with the instruction and begins dialing new control information while the instruction is still being played.

In this illustrative embodiment, it is assumed that the service entry number is a three-digit code preceded by the star (*) sign such as "*267" or "*268" with the latter code indicating that the originator is experienced and only requires abbreviated prompts. If the customer dials a valid service entry number, the digits are collected as shown in boxes 1400–1405 in FIG. 14. As the customer uses his station keyset to dial the service entry number, tone receiver 138 collects the digits and forwards them over control bus 134 to NSC processor 101. Tone receiver 138 performs the digit and interdigit timing and functions similar to many well-known digit receivers used in telephony. Upon collecting all the digits, a return is made to the main flow diagram in FIG. 15 where the customer is prompted to dial a code indicating the number of audio ports desired as shown in box 1509.

The system is designed to interact with the user by prompting the user with appropriate announcements. It is anticipated, however, that a customer may err when dialing in response to the instructions given by the announcement system. Accordingly, the system is designed to keep track of the number of errors made by the conference originator. Thus, if a customer makes an error, he can be reprompted to take corrective action. If, however, the customer makes a series of errors, the system will automatically summon an operator to assist the customer. For example, should the conference originator neglect to dial and the system detects that timing has elapsed or the originator dials the wrong service entry number as shown in boxes 1504 and 1505, processor 101 would determine if the originator had made any prior errors as shown in boxes 1200–1206 in FIG. 12. If the customer had made too many errors, an announcement would be played to the conference originator asking the originator to stand by while an operator is being summoned to assist him or her. The network services complex then originates a call over an idle T1 trunk in link 131 and the telephone network to operator position 137, and the operator is connected via the time slot interchange 124 to the T1 trunk serving the conference originator. The operator can now assume control of the call and proceed to establish the conference. By assuming control, the tone receiver 138 is connected via time slot interchange 124 to the time slot assigned to the trunk over which the operator was summoned so that the operator can dial instructions into the network services complex for setting up the conference. The conference originator can be connected to the bridge in the usual manner as any of the conferees and control of the bridge will be exercised by the operator.

If the threshold of errors had not been exceeded, the conference originator is told by an announcement that an error has been made and then prompted with a message asking the customer to redial. This occurs when processor 101 executes boxes 1200–1206 in FIG. 12 and sends the appropriate orders to data store 125.

If the conference originator dials the correct service entry number, the NSC processor 101 sends an order to data store 125 to have a prompt played to the originator. This prompt will ask the originator to dial the number of ports needed for the conference.

The digits dialed by the originator are collected by tone receiver 138 and forwarded to NSC processor 101 where the processor ascertains if they are valid.

At this point in the operation, only the digits 0–9 represent a valid code and as many as 60 audio ports can be assigned to a single conference. Although each bridge has a 64 port capability, 4 ports are reserved on a rotational basis for maintenance purposes and only 60 are actually used for conferencing. If a star (*) or pound or number (#) sign are dialed or the customer does not dial (i.e., time-out), the processor treats this as an error as shown in boxes 1512 and 1513 and would reprompt the originator to take corrective action if the threshold had not been exceeded. If the threshold has been exceeded, processor 101 would summon the operator as described above.

Assuming that the originator dials a one or two digit code representing the number of audio ports wanted for the conference, processor 101 consults its memory 1100 to ascertain if the number of ports requested are available. If sufficient ports are available as shown in box 1600, processor 101 commands data store 125 to transmit a confirmation announcement that a sufficient number of audio ports are available as shown in box 1603. If not enough ports are available, processor 101 orders the data store 125 to play back an announcement indicating this to the originator. The originator can abandon the conference and place the conference call at a later time. The originator now dials the pound (#) sign to reserve the audio ports. Processor 101 responds to the dialing of the pound (#) sign by marking the ports in memory as being assigned to this particular conference. If the originator neglected to dial the pound (#) sign, processor 101 would time the call and after a predetermined interval would enter the sequence of events for reserving the data ports as shown in box 1607 just as though the pound (#) sign was dialed. Similar action takes place if the originator dials a digit in the sequence 0–9, except that the digits are ignored.

If the originator dials a star (*) sign, the originator is prompted to redial as shown in box 1604, and a loop in the program sequence is made until the originator dials the correct port selection code for the number of available ports or hangs up. By dialing the star (*) sign, the originator has the opportunity to change his mind and select a different number of ports before the ports are reserved as described above.

Let it be assumed that the conference originator dialed the code for the number of audio ports desired followed by the pound (#) sign. Upon receiving this, NSC processor 101 transmits an order to data store 125 to have the appropriate announcement played to the originator for assisting the customer in establishing the data portion of the conference. In this case, the announcement requests the conference originator to dial a code indicating the number of data ports to be reserved as shown in box 1610.

In the case of a data conference, 60 ports are available and upon receiving a code representing the number of ports that the originator desires (box 1700), processor 101 examines a table in memory 1100 to ascertain if that number of data ports are available. If there are sufficient data ports available, they are reserved for this conference by processor 101 and processor 101 transmits an order to data store 125 to have a confirmation announcement sent to the originator as shown in box 1705.

The sequence of operation with respect to reserving data ports if sufficient data ports are available is similar to the sequence of operations described above with respect to the reservation of the audio bridge ports. This is set forth in FIG. 17 but need not be further described for a complete understanding of the invention.

The NSC processor 101 will now order data store 125 to play an announcement to the originator requesting that the originator dial the directory number assigned to the telephone station of the first audio conferee as shown in box 1715. In this illustrative embodiment, the directory number for an audio conferee takes the form 1-NPA-NXX-XXXX where the one prefix indicates that this is a conferee to be added to the bridge, and the NPA is the three-digit area code while the NXX-XXXX are the three-digit office code and telephone number of the conferee. The directory number assigned to data terminals in this embodiment takes a distinctive form and is preceded by the pound (#) sign and the digits 9988. Examples of typical directory numbers assigned to telephone stations and data terminals are shown in FIG. 1.

It will be noted that each conferee directory number is preceded by the digit 1. This permits the other digits on the station dial (i.e., keyset) to be used for control signals as will be described below.

Let it be assumed that the originator dials the prefix 1 as shown in box 1800 followed by the ten-digit code (boxes 1810–1811) of the first audio conferee. Since the tone receiver 138 is still connected to the conference originator, these digits are collected by the tone receiver and forwarded to processor 101. The NSC processor 101 records the number dialed by the originator and associates it in its memory with the particular conference for future use and now transmits a service request via CCIS terminal 126 and link 132 to toll switching system 102. In addition, processor 101 selects an idle trunk (i.e., time slot) in T1 link 131 to the toll switching system. The directory number of the called conferee is forwarded over the link 132 (box 1812) and toll switching system 102 responds by originating a call over the network to the called conferee station in a well-known manner.

When the conferee answers (box 1814), the trunk that the conference originator is using is connected via time slot interchange 124 to the trunk that was used to summon the conferee. In this mode, the originator can converse privately with the conferee and inform him/her that a conference call is in progress and that he/she is to be added to the bridge. The originator now depresses the pound (#) button on his keyset to add the conferee to the bridge.

Before adding the conferee, processor 101 interrogates its memory to ascertain what type of conference is to be set up (box 1822). As will be recalled, the conference originator can elect to establish an audio/only, a data-only, or a combined audio/data conference. The processor must now take steps to assure that if an audio conferee was designated by the originator, that the audio conferee is not added to a data conference or that a data conferee is not added to an audio conference.

Thus, in the example being described, the processor 101 ascertains that this is a combined audio/data conference and NSC processor 101 send an order to the data store 125 requesting that the originator be prompted (box 2000, FIG. 20) with an announcement as to what keys to depress to add the conferee to the appropriate bridge or disconnect the conferee completely.

In the example being described, the originator will transmit the digit 8 (box 2007) if he/she wanted to release the conferee, transmit the digit 2 (box 2003) if he wanted to add the conferee to the audio bridge and transmit the digit 4 (box 2006) to add the conferee to the data bridge. If it is assumed that the conferee is an audio conferee and the originator transmits the digit 2 as shown in box 2003, then processor 101 verifies from its memory that the called conferee is an audio customer (box 2008) and that the conferee has not disconnected before the conferee is added to the bridge (box 2015).

In response to the digit 2 being transmitted by the conference originator, processor 101 selects an idle audio port from its memory which contains an indication of the status of all ports and sends an order to time slot interchange 124 to interconnect the trunk over which the conferee was called with the selected port. In addition, processor 101 sends an order to audio bridge 128 via control bus 134 identifying the conference and the leg or port to be added to the conference.

The NSC processor 101 now orders the data store to deliver another prompt to the originator. This prompt informs the originator that the conferee has been added to the bridge and requests the originator to dial the next conferee or to depress the 2 button so that the originator may be added to the conference bridge.

The conference originator continues by dialing the numbers assigned to the remaining conferees until all conferees have been connected to the audio bridge.

If the originator had dialed the directory number associated with a data terminal and wishes to add this terminal to the data bridge, the originator keys the digit 4 as shown in box 2006. The processor 101 then verifies that this is a data station and instructs data bridge 135 to add the data port to a particular bridge. This is accomplished in a manner similar to the action described above with respect to the addition of a conferee to an audio bridge, namely, the processor 101 sends orders to the data bridge indicating the conference number and the port to be added. Processor 101 also orders data store 125 to play back an announcement requesting the originator to wait for an answer from the data terminal. The data bridge exchanges supervisory signals with the called data terminal (sometimes referred to as a "handshake") and reports back to the processor 101 that the port has been added. Processor 101 then transmits an order over bus 134 to data store 125 so the data store can announce (box 2017) to the conference originator that the data terminal he/she has requested has been added to the data bridge.

The sequence of events described above with respect to adding both audio stations and data terminals to the conference bridges is repeated until all conferees have been added. When the originator is ready to join the conference, the originator depresses the "2" button on his keyset.

Recognizing the digit "2" processor 101 ascertains if the originator had been on the conference before (box 1900). If not, processor 101 orders data store 125 to play back an announcement (box 1901) to the originator prompting the originator of the various options and control features that are available with the conference service. The conference is now in a stable state and the audio conferees can converse with each other and exchange data via their data sets. Supervision of the various conference legs is monitored by the toll switching system 102 for a disconnect (box 1907). Should any of the parties disconnect, processor 101 receives a message over link 132 informing the processor of the disconnect. The processor then begins timing the conference to determine if this is a valid disconnect. If all conferees disconnect (boxes 1910 and 1913) within the time interval, processor 101 orders the data bridge processor and audio bridge processor to disconnect the legs of the respective bridges so they may be available for other conferences. If all conferees have not disconnected within the time interval and the originator has disconnected, the teleconferencing operator is summoned as shown in box 1912 and FIG. 13.

6. Sequence of Operations—Conference Billing

The above description sets forth the sequence of operations in establishing an audio/data conference under customer control. In establishing a conference, certain billing procedures must also be followed in order to charge the customer for the use of the conference service, and these procedures will now be described.

In accordance with a feature of the invention, the charges for service will not only depend on how long the facility is used but also for what purpose the facility is being used.

With reference to the conference arrangement disclosed in this embodiment, the originator will be charged for the entire conference service. It will be appreciated from the following description, however, that billing data is gathered on various segments of the conference call, thus making it possible to divide the cost among the conferees if one so desires.

Billing for a conference has been segmented into two categories, namely, bridge charges and transport, or leg charges. To calculate the bridge charges, a bridge record is kept for each conference whether the conference is initiated by a customer or an operator. Should a combined audio/data conference be established, then separate audio bridge and data bridge records are kept.

The bridge record takes into account several factors including the number of legs (i.e., conference channels or ports) that are reserved for the conference. If during a conference the leg requirements change, a new bridge record is created to reflect the new bridge size.

Leg records are created for each call into and out of the network services complex. These records accumulate the charges on a per leg basis including toll charges for facilities between the bridge and the conferee station.

A description of the sequence of operations relating to the procedure for gathering billing information will now be given with reference to FIGS. 22–32. It will be appreciated, however, that the functions performed by the various systems of the network services complex with respect to gathering billing information (FIGS. 22–30) are carried out in conjunction with the call processing functions previously described with respect to the flow diagrams in FIGS. 12–20. Thus, to simplify the call processing flow diagram, FIGS. 12–20 do not include references to billing operations which are being carried out during call processing. Likewise, the flow diagrams of FIGS. 22–30 which emphasize the billing operation, only describe in general functional terms the call processing events that trigger the various billing functions.

Figure 22:
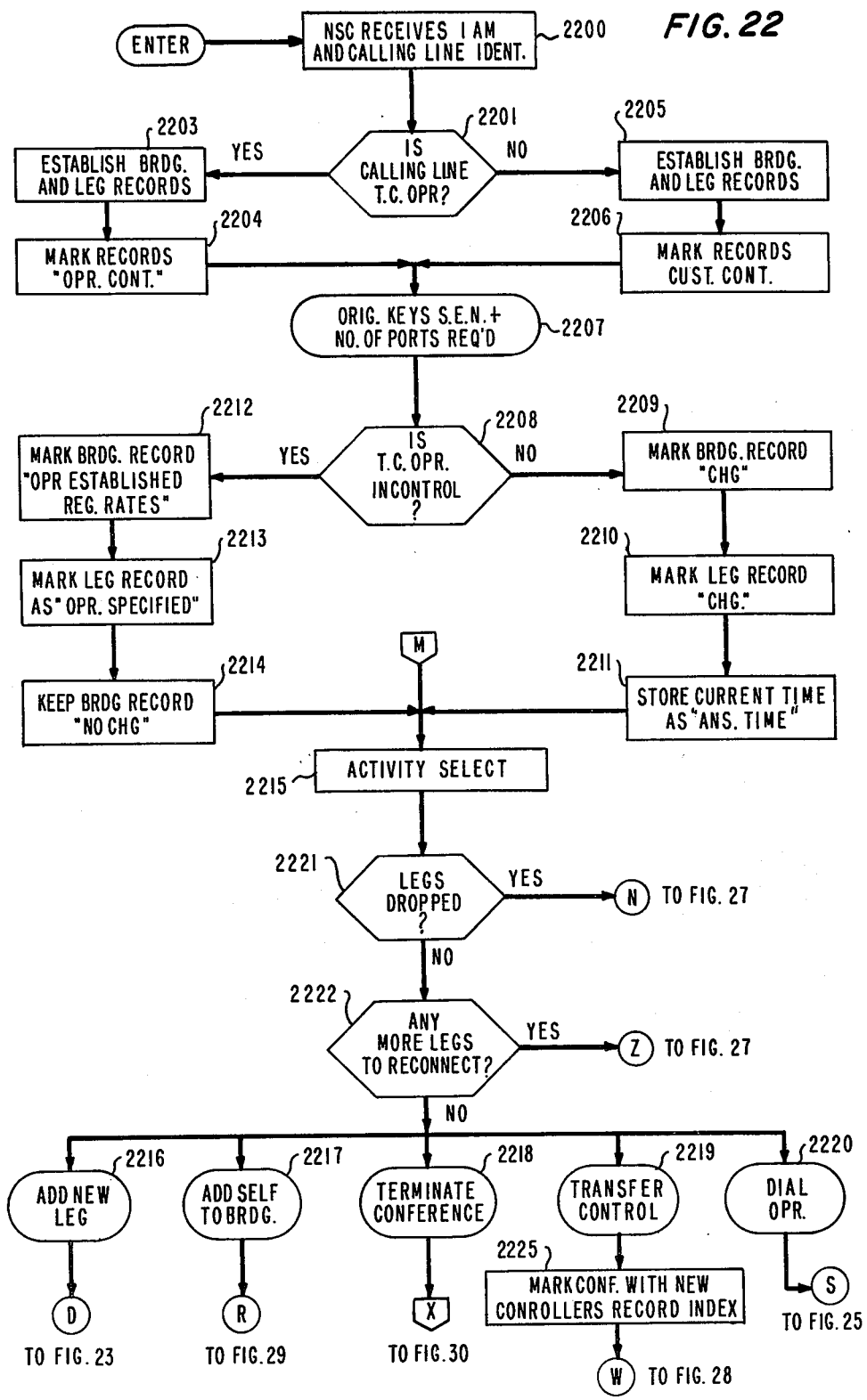
FIGS. 22–30 show a flow diagram of the overall operation with respect to billing the customers.

When the call from a conference originator is directed to the toll switching center 102 and network services complex 100, the NSC processor 101 is informed of the call through the receipt of an "initial address message" over data link 132 via CCIS terminal 126 as shown in box 2200 of FIG. 22. If the call is accepted by the complex, processor 101 receives the calling station identity and determines if this is a conference call originating from a customer station or from a teleconferencing operator. The processor then establishes in its memory, a bridge record for the conference and a leg record for the originator.

The contents of typical leg and bridge records are represented by the tables in FIGS. 31 and 32 which will now be described.

The first item of information on the first line of a bridge record (FIG. 32) is the type of bridge i.e., whether the record pertains to an audio bridge or a data bridge. The next item is the conference identity number which is assigned by the NSC Processor 101. Following this information is the billing type which indicates whether this is a specially billed call such as a credit card call, a call billed to a third party, etc.

Also included in the bridge billing record are the number of conference ports reserved for this bridge. The number of ports that are reserved is broken down into ports reserved by a customer and those ports reserved by a teleconferencing operator. The answer time and disconnect times are also kept in the bridge billing record including the midnights past digit (MPD) indication which records the number of days (24 hour periods) a bridge is in continuous use on a conference.

The bridge billing record includes the directory number of the customer who originated the conference i.e., the calling number, and the number of legs that have been established. The number of legs established may differ from the number of ports reserved since the customer in control of the conference may elect not to use all of the ports during the entire conference.

The bridge record also indicates whether a bridge has been established by an operator or a customer as shown in the next to last entry in the table of FIG. 32. The last entry in the bridge billing record is the information digit which can be set to indicate a charge, a no charge or a charge-guard condition.

FIG. 31 shows a typical leg billing record which contains information relevant to a conference leg similar to the information found in the bridge billing record. In addition to this information, the leg billling record contains information peculiar to a conference leg. For example, the leg record indicates the identity of the called conferee station that is connected to the leg, whether this leg is the controller and the identity of the leg, a number which is assigned by the NSC processor 101.

The leg billing record also indicates whether the leg was established by an operator and the operator's identity number which is used for such things as operator services studies, etc. Furthermore, this record indicates whether the leg is in stable condition or has been dropped, and an indication is kept in the record linking this leg with the next leg assigned to the conference or whether this is the last leg in the link list.

In accordance with one feature of the invention, the leg billing record also contains information fields for computing billing allowances. As will be described in more detail below, a billing credit is given to a customer when a leg is being used to reestablish a connection to a conferee that has been inadvertently dropped. As with the bridge billing record the information digit, in a leg record, can indicate a charge, a no charge or a charge-guard condition.

Returning now to a description of the sequence of operation with reference to FIG. 22, once a leg and bridge record have been established for a customer who is originating the conference, no action is taken with respect to billing until the originator dials the service entry number and the number of ports desired for the conference as shown in box 2207.

In response to the dialing of the service entry number, processing 101 updates the bridge and leg records associated with the originator and establishes more leg records if additional leg records are needed. The updating of the records depends on whether a customer or teleconferencing operator is in control. If a customer originated the conference call, and is therefore, the controller, the bridge record and his or her leg record are marked "charge" and the current time of day is stored in the answer time field. Thus, billing can begin for the originator's leg and the bridge as soon as the originator is connected to the conference system. If an operator had originated the conference call, the bridge record would be marked "Operator Established Regular Rates." The leg record would be marked as "Operator Specified," and the bridge record would be kept as "No Charge" (boxes 2212–2214).

The conference now enters an activity select state as shown in box 2215 and waits for further action by the originator. This action might be to add a new leg, add the originator to the bridge, terminate the conference or transfer control to another party on the bridge. While the originator/controller is in the activity select state boxes 2221 and 2222 are executed to determine if any legs have erroneously dropped and have to be reconnected. Announcements can be played to the controller informing the controller of what action to take to reconnect the dropped legs before proceeding with the conference.

Let it be assumed that the originator wishes to add a new leg by dialing the station identity of the conferee to be added. As described above, the dialed number is forwarded to processor 101 by tone receiver 138, and processor 101 initiates a call over data link 132 to toll switching system 102. Toll switching system 102 responds in a well-known manner by routing the call over the communication network to the called conferee telephone station.

Figure 23:
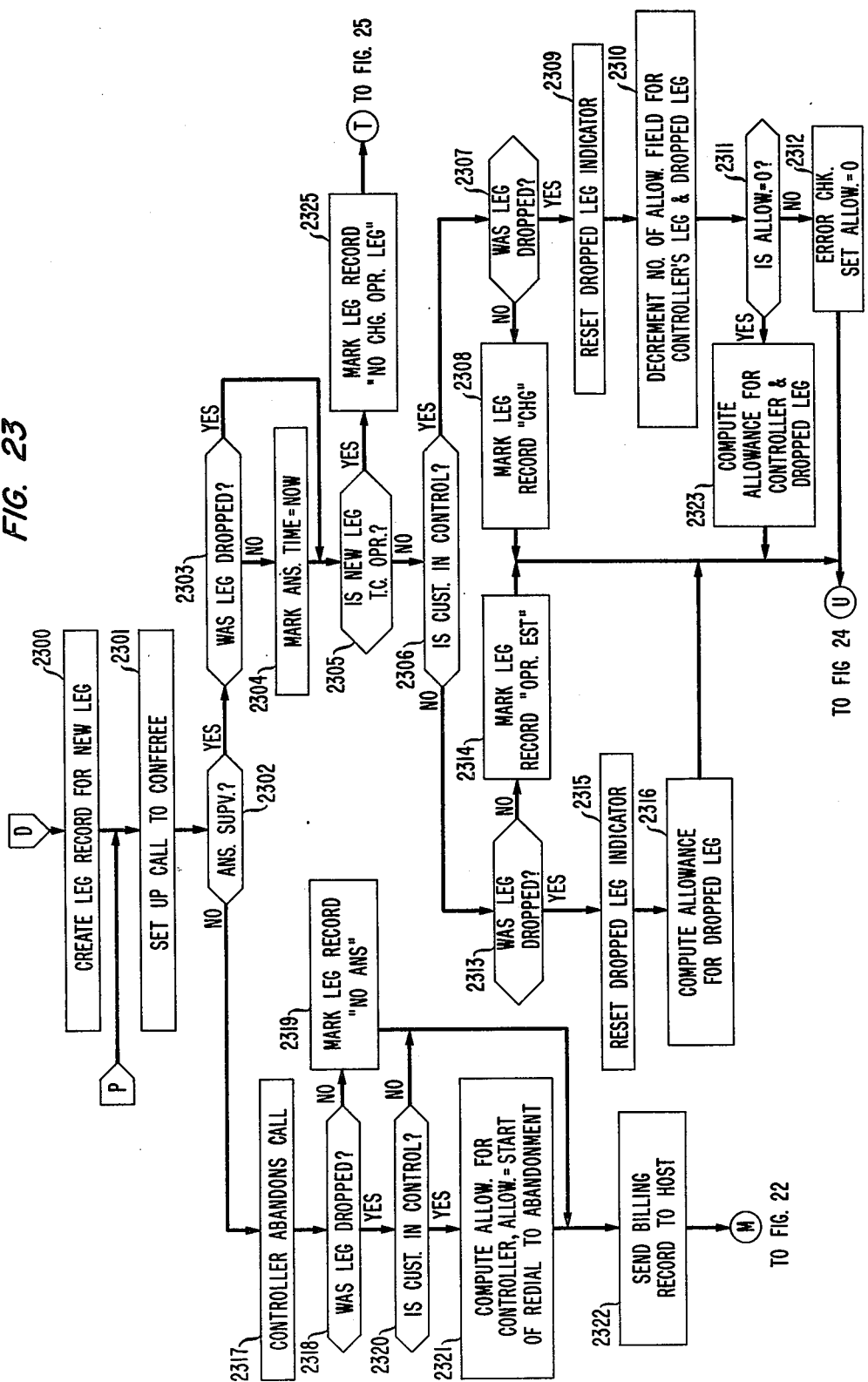

At this time the processor also establishes a leg record for the new leg as shown in box 2300 of FIG. 23.

When answer supervision is detected by the toll switching system and forwarded to processor 101 via data link 132, processor 101 executes the "yes" branch of box 2302 in FIG. 23.

Processor 101 now examines its memory (box 2303) to ascertain if this is a new leg being added or a leg being reconnected that had previously dropped. Since this is a newly connected leg, the current time is entered in the "answer time" field of the leg record as shown in box 2304 and a test is made to determine if the leg was to the teleconferencing operator or a customer conferee as shown in box 2305.

Assuming that a customer conferee is connected to this leg, the "no" branch of box 2305 is executed, and since a customer is in control of the conference, the "yes" branch of box 2306 is executed. Having determined that this is a new leg, the "no" branch of box 2307 is executed and the leg record is marked "charge" as shown in box 2308.

Had the leg been established to an operator, the leg record would be marked "no charge-operator leg" as shown in box 2325. A decision is now made by the controller whether or not to add the conferee as shown in box 2400 of FIG. 24.

As mentioned above, when a conferee is summoned to the conference, the conferee is initially connected directly with the controller for private conversation, and the controller must actuate the pound (#1) key followed by the digit 2 to add the conferee to the bridge. Assuming that the person in control of the bridge actuates the pound key followed by the 2 key as shown at reference designation 2401, then processor 101 ascertains whether the leg was established by the operator or if the leg was established when a customer was in control of the conference. Had the leg been established by an operator, processor 101 would have to mark the leg record "charge" at this time, and enter the current time in the "answer time" field, as shown in boxes 2403 and 2404. Since it has been assumed that the leg was established by a customer, these functions have already been carried out by the execution of boxes 2304 and 2308.

Up to this point in the progress of the call, the originator has accessed the conference arrangement and the appropriate leg and bridge records have been established. The originator has also added a leg serving another customer conferee, talked privately with this conferee and then transferred the conferee to the bridge. In the case of a customer dialed leg, transport charges for the leg begin to accrue when the called customer answers. If the operator has established the leg, charges would begin when the leg was added to the conference.

Processor 101 now returns the conference to the activity select state and ascertains if any legs have been disconnected or if any legs have to be reconnected to the bridge by executing boxes 2221 and 2222 in FIG. 22. If no dropped legs have to be reconnected, the controller can now dial additional conferees, add his or her station to the conference, or take other control action as shown in FIG. 22.

Let it be assumed that the controller has added several audio legs and data legs to the bridge, and as each leg was added the appropriate leg billing records were established. The controller now actuates the "2" key (box 2217) and adds his or her station to the conference. Processor 101 now determines if the teleconferencing operator or a customer is in control as shown in box 2900 in FIG. 29. And since the customer is in control, the conference is marked stable (box 2906) awaiting further action by the controller or any of the other conferees. Thus, to take further action, the controller must actuate the pound (#) key to get off the bridge and get into the activity select mode before exercising control of the bridge.

No further action with respect to billing is taken by the processor at this time until a leg disconnects, the conference terminates, a new leg is added or the teleconferencing operator is summoned by the customer in control.

Let it now be assumed that a conferee leg has dropped because a conferee disconnected inadvertently, or an equipment failure caused the leg to be dropped.

In accordance with a feature of the invention, certain billing allowances will be made to compensate the controller while the controller is attempting to reestablish the dropped leg.

When a conferee disconnects or a leg is dropped, on-hook supervision is detected by the toll switching system monitoring the trunk which is connected to the conferee. Upon receiving the on-hook supervision, switching office 102 sends a message over data link 132 to processor 101. Processor 101 identifies the leg that dropped and enters the current time in the disconnect time field of the leg record (box 2601) and increments the "number of allowances" field by 1.

If the controller is on the bridge ("yes" branch of box 2602), processor 101 then orders data store 125 to play a tone on the bridge (box 2603) to alert the conferees that someone has disconnected from the bridge.

If the controller had expected the disconnect, the tone would be ignored by the controller, and the remaining conferees would continue the conference. Since this example is being considered as an inadvertent disconnect, the controller actuates the pound (#) sign to get off the bridge (box 2604) and into the activity select mode to take the necessary action to restore the dropped leg.

At this time processor 101 may execute the process described in boxes 2606–2610 to create allowances for each leg depending on who is in control of the conference. More specifically, it is contemplated in this illustrative embodiment of the invention, that when the teleconferencing operator is connected to the bridge, transport charges for all legs will be suspended until the operator gets off the bridge. It is felt that since the operator is usually not a party to the conference call, the conferees will feel hampered in discussing the business for which the conference was called. On the other hand, when the teleconferencing operator gets off the bridge, the allowance is terminated. Similarly, an allowance is given to a customer-controller leg record when the operator is in control of the conference.

Accordingly, if the operator was in control and gets off the bridge to reestablish a dropped leg, the "yes" branch of box 2605 is executed, and the processor goes through each leg record and decrements the "number of allowances" field. If the field is now decremented to 0, the elapsed time of the allowance is computed by subtracting the allowance start time from the current time. The elapsed time is entered in the "allowance elapsed time" field of the leg record.

The "number of allowances" field in each leg record is used to keep track of the billing allowance treatment applicable to the leg associated therewith. It is possible that a leg can be receiving multiple allowances depending on various circumstances. For example, the controller may get off the bridge to reestablish a dropped leg and therefore be entitled to an allowance while his leg is being used to reestablish a dropped leg. At the same time, an operator might be summoned to the bridge thereby causing all legs to receive an allowance by virtue of the fact that the operator is connected to the bridge. Under these circumstances the controller's record would be receiving two allowances concurrently.

While it is possible to give the leg credit for both allowances, the illustrative embodiment is arranged to credit a leg for a single allowance. Thus, when an event occurs that entitles a leg to an allowance, the current time is entered in the "allowance start time" field of the leg record, and the "number of allowances" field is incremented. If other events occur that entitle the leg to an allowance, the "number of allowances" field is incremented but no further entries are made in the "allowance time" fields.

As corrective action is taken, and the leg is no longer entitled to a particular allowance, "the number of allowances" field is decremented. When this field is decremented to 0, the current time is then entered in the "allowance end time" field and the elapsed allowance time is calculated. The elapsed time is then added to any time priorly stored in the "allowance elapsed time" field.

Thus, the elapsed allowance time is calculated from when the first allowance occurs until the last allowance has expired, and the elapsed time of allowance is accumulated for each leg until the leg is disconnected or until the conference is ended.

Returning now to the description of the sequence of operations and the flow diagram of FIG. 22, it will be recalled that the customer-controller got off the bridge and into the activity select mode after hearing the warning tone indicating that a leg had dropped. Processor 101 executes box 2221 to determine if any of the legs have dropped, and box 2222 to determine if any of the legs need to be reconnected.

Each dropped leg is identified by processor 101 and put into a queue (box 2703) along with the identity of other legs that have to be reconnected. Periodically this queue is unloaded, and the identity of the conferee is announced to the controller, (as shown in box 2704) along with the prompts telling the controller what to do to reestablish the leg.

The controller has thirty seconds to respond, as shown in boxes 2705 and 2706, and if the controller transmits the digit 3 indicating the dropped leg should be reestablished, processor 101 enters the current time in the "allowance start time" field and increments the "number of allowances" field in the leg record associated with the controller's leg as set forth in boxes 2709–2711.

Processor 101 sends an order to the host switching system 102 to establish a connection to the dropped conferee (box 2301). If it is assumed that answer supervision is received on the leg, the "yes" branch of box 2302 is executed. Since a dropped leg is being reconnected and an answer condition has already been recorded in the leg record, the "yes" branch of box 2303 is executed and the processor determines whether the leg is to a teleconferencing operator by executing box 2305. Upon ascertaining that the leg being reconnected is to a customer conferee, processor 101 determines if the customer is in control (box 2306).

Box 2307 is now executed by processor 101 and since the leg being established is a dropped leg, the "yes" branch of that box is executed causing box 2309 to be executed by the processor. As seen in FIG. 23, the dropped leg indicator in the leg record for the dropped leg is now reset, and an allowance must be computed for the controller's leg since the controller's leg was being used to reestablish the dropped leg, and the controller could not participate in the conference. An allowance is also computed for the dropped leg while the leg was not connected to the conference.

Figure 27:
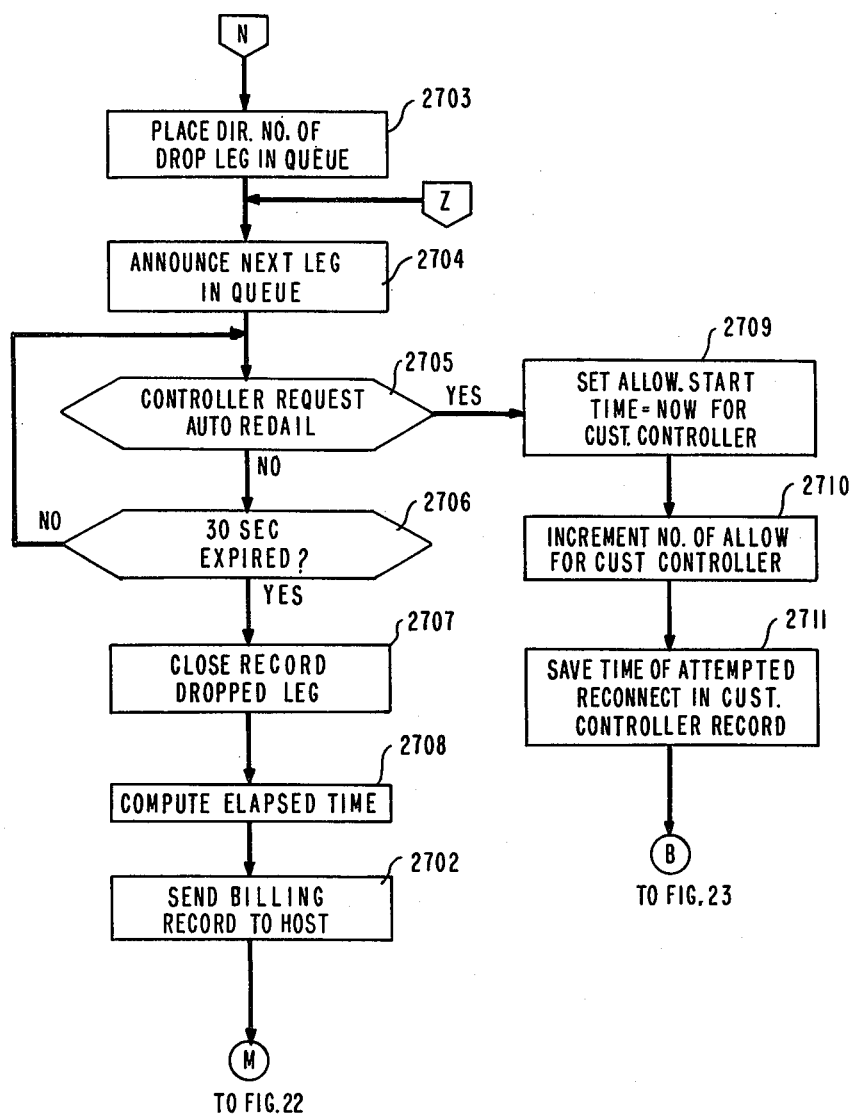

It will be recalled that when the customer controller came off the bridge to reestablish the dropped leg, the current time was entered in the "allowance start time" field and the "number of allowances" field was incremented by one (FIG. 27, boxes 2709 and 2710). When box 2310 is executed upon the reestablishment of the dropped leg, the "number of allowances" field is decremented for the controller and the dropped leg, and since only one allowance had been recorded in this field, the field now reads zero. Any time the "number of allowances" field reads 0, the processor enters the current time in the "allowance end time" field and computes the elapsed time for the allowance (as shown in box 2313).

The elapsed time is then added to any allowance already recorded in the "allowance elapsed time" field.

Thus, to summarize the above sequence of events, when a leg drops or disconnects from the bridge, a tone is applied to the bridge to inform the conferees. If the disconnect was expected, the tone is ignored and the conference continues. If the disconnect is unexpected, the customer in control can get off the bridge to learn the identity of the dropped conferee. If the customer in control then decides to reconnect the dropped leg, the dropped leg is automatically redialed by the network services complex, and the controller's leg is credited with a billing allowance during the time that the controller is using his leg to reestablish the dropped leg. The leg record for the conferee that disconnected is maintained during this interval, and an allowance is credited when a conference channel is reestablished to the dropped conferee.

Figure 24:
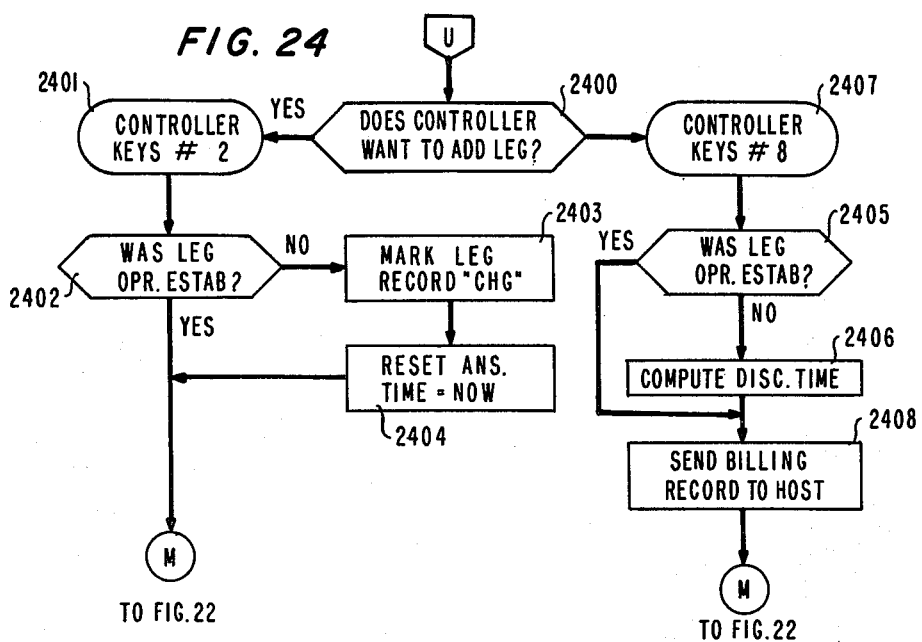
Figure 25:
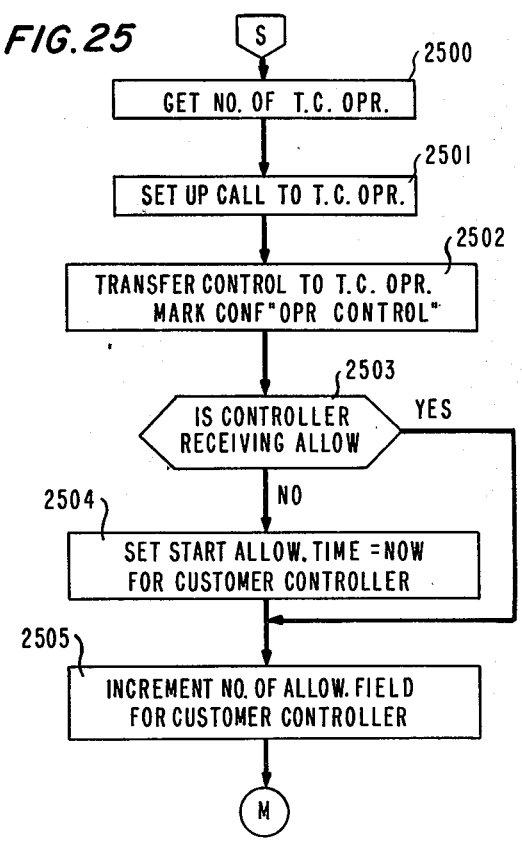
Figure 26:
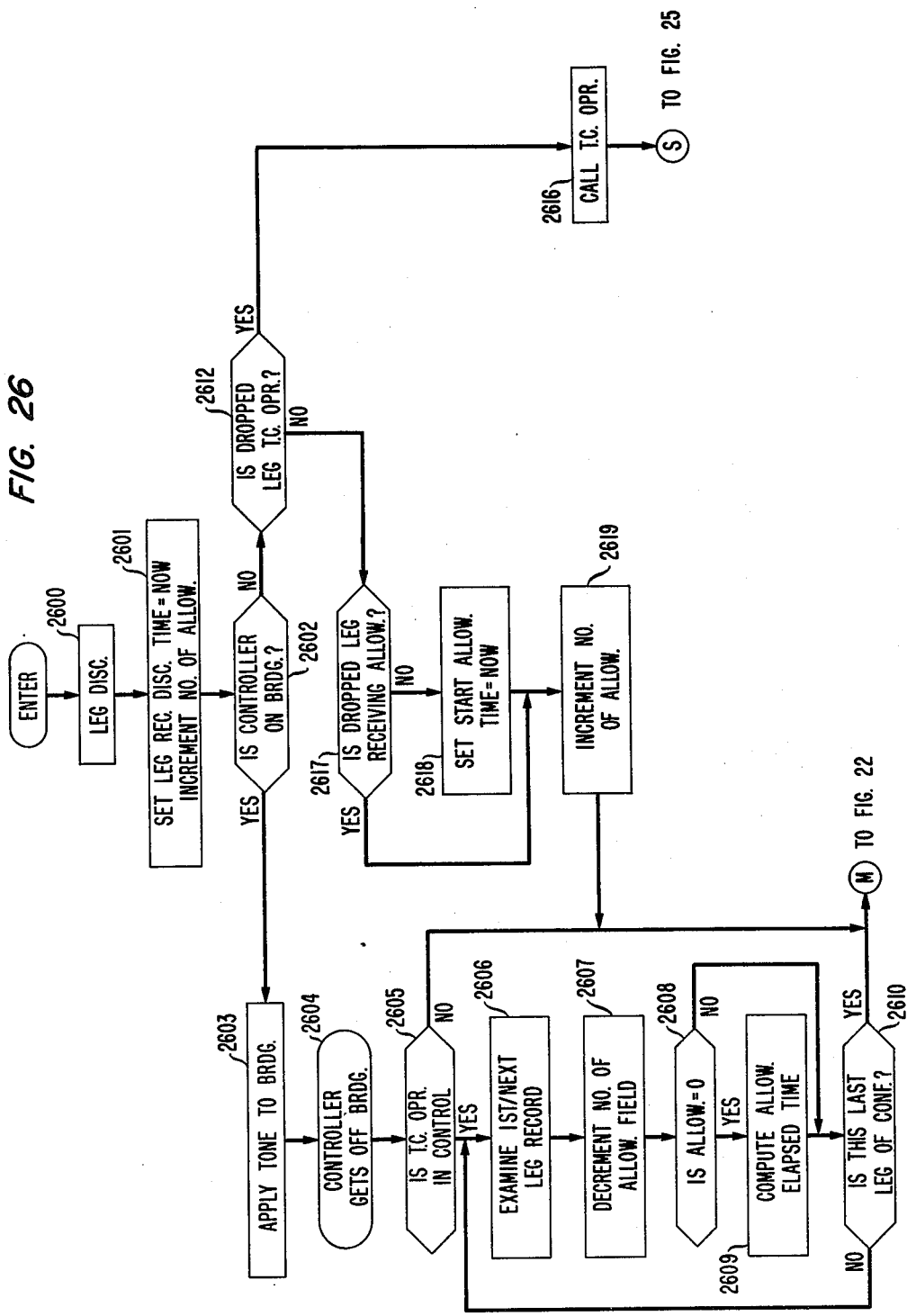

Returning now to the description of the sequence of events with reference to FIG. 24, the controller must decide whether or not to add the dropped leg to the conference. If the controller desires to add the leg, the controller keys the pound (#) sign followed by the digit 2 as shown at reference designation 2401, and a determination is made whether this leg was operator established or customer established. This determination is made by the execution of box 2402 and establishes a charge condition for the leg if the leg had been established by the operator. Since this leg was established by the customer in control, a charge condition was already established when box 2308 was executed as previously described. After the dropped leg is reconnected to the bridge, the conference is returned to the activity select mode. Processor 101 now determines if any other legs have dropped and need to be reconnected as shown in boxes 2221 and 2222. If no other legs have to be reconnected, the controller must now transmit the digit "2" in order to join the conference (box 2217).

Figure 29:
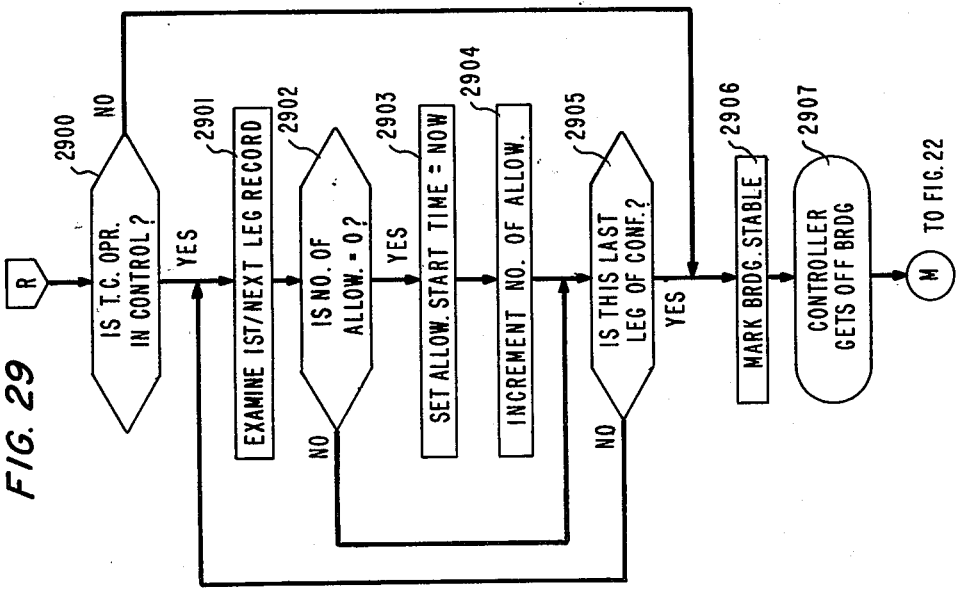

When the digit "2" is transmitted, a determination is made if the operator is in control or if a customer is in control (box 2900 in FIG. 29). If a customer is in control, the conference is marked stable (box 2906), and no further action is taken until the conference is terminated or until the controller takes further action by getting off the bridge to add a leg or if a leg drops inadvertently.

Had the operator been in control and transmitted the digit "2" in order to be added to the bridge, the processor would execute the process shown in boxes 2901-2905 to increment "the number of allowances" field for each leg. As noted above, an allowance is credited to each audio leg when the operator is connected to the bridge.

At any time, the person in control of a conference can transfer control to a conferee already on the conference or to the teleconferencing operator. If a customer in control wishes to summon the operator, the customer keys in the digit "0" reference designation 2226 in FIG. 22) and processor 101 executes the sequence of events depicted in FIG. 25.

More specifically, the processor ascertains the telephone number of the teleconferencing operator and establishes a connection via the network to the operators position as shown in box 2501. The operator assumes control of the conference and the current time is entered in the "allowance start time" field for the customer controller's leg record. In addition the "number of allowances" field is incremented in the same leg record.

If the teleconferencing operator joins the conference by adding his or herself to the bridge, the appropriate allowances are made for all legs while the operator stays on the bridge.

A teleconference operator can also be summoned by directly dialing the operator's station the same as adding another leg to the bridge. In this instance, the "yes" branch of box 2305 would be executed, the leg would be marked "no charge" and the processor 101 would execute the program depicted by the flow chart in FIG. 25.

Figure 28:
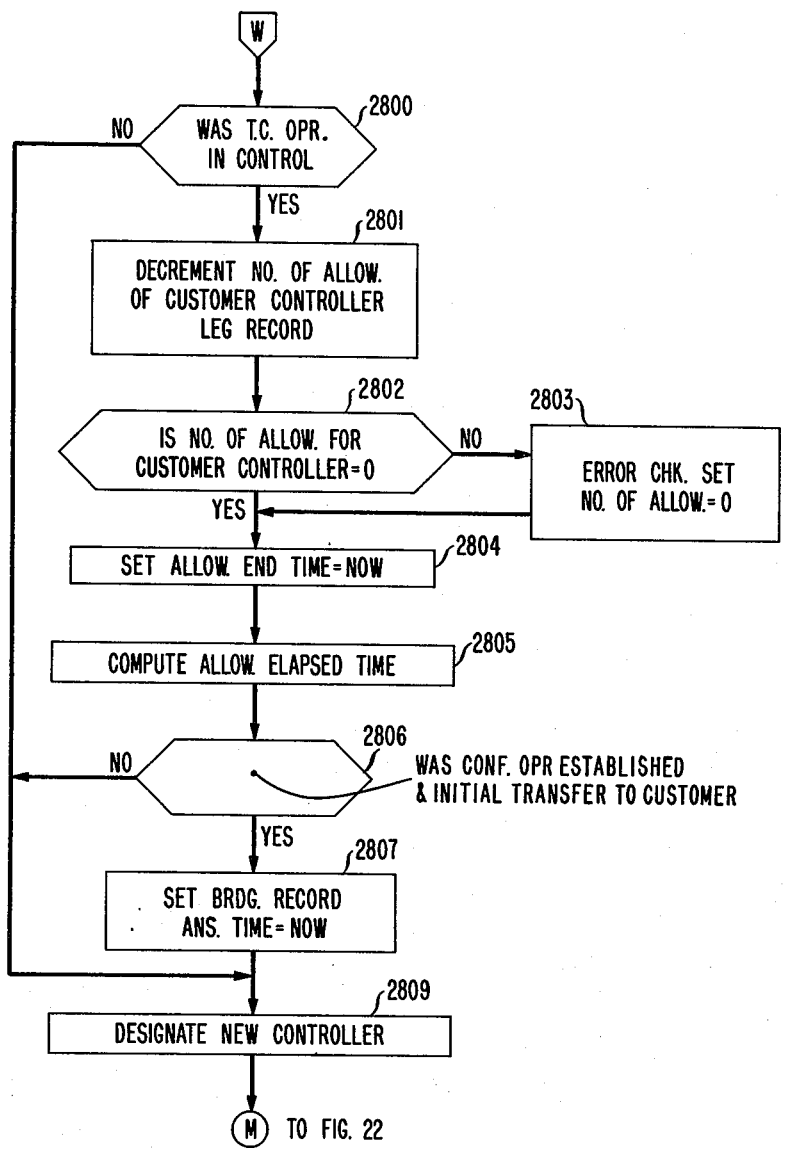
Figure 30:
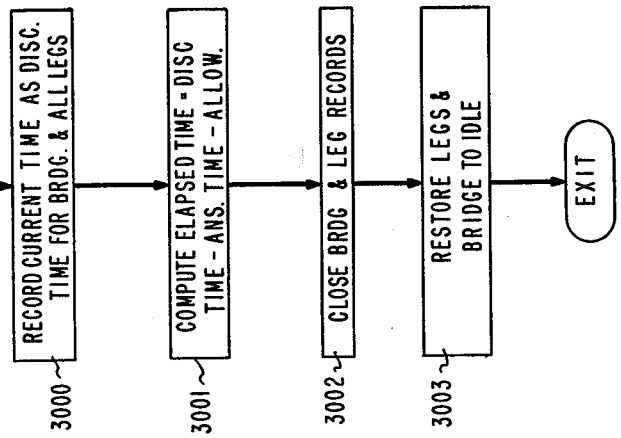

Should the person in control of a conference wish to transfer control to another conferee, (reference designation 2219 in FIG. 22), the controller dials the appropriate code and the transfer is effected. The conference record is now marked with the identity of the new controller and the process depicted in FIG. 28 is executed. More specifically, if the teleconferencing operator was in control and transfers control to a conferee, the "number of allowances" field is decremented for the controller's leg. If the "number of allowances" field equals zero the current time is entered in the "allowance end" field for that leg and the allowance elapsed time is computed. This operation is performed by executing the operations shown in boxes 2801-2805. If the conference had been established by the operator, the current time would now be entered in the bridge record "answer time" field to start the charging for the bridge facility.

In summary, it can be seen from the above description that certain facilities can assume any of several states which may be considered to determine the cost of service. More specifically, a facility in the illustrative embodiment can be busy, idle, reserved, used to reestablish a connection to a disconnected facility, etc. In the examples described, the time during which each facility is in use and the nature of the use determines the billing for the facility. Thus, when a controller's leg is being used to reestablish a dropped connection, a billing allowance is computed for the controller's leg. Similarly, when an operator is connected to the bridge, a billing allowance is credited to each audio leg of the conference since the conferees are not enjoying the privacy of a conference while the operator is connected.

It is to be understood that the above-described arrangements are merely illustrative of the application of the principles of the invention. Numerous other arrangements may be devised by those skilled in the art without departing from the spirit and scope of the invention. For example, since individual records are kept for each component (i.e. audio leg, data leg, bridge, etc.) the costs can be divided among the conferees.

What is claimed is:

1. In a communication system having a plurality of customer stations, communication circuits and means for coupling said circuits to said stations, an arrangement for ascertaining the usage of said circuits by said stations comprising:

means for recording the elapsed time that each said station is coupled to an associated one of said circuits for communication, control means responsive to the uncoupling of a first one of said stations from a first one of said circuits for causing a second one of said stations to utilize a second one of said circuits coupled thereto to control the recoupling of an idle one of said circuits to said first station, and means for deducting from the elapsed time recorded for said second circuit the interval said second circuit is controlling said idle circuit.

2. The invention set forth in claim 1
wherein said circuits comprise communication channels connectable to said stations,
wherein said recording means includes means responsive to answer and disconnect signals from said channels for registering the time interval between said signals,
wherein said control means comprise means responsive to a disconnect signal from the channel of said first cirucit for transmitting an alerting signal to said second station and means responsive to said alerting signal and said second station for connecting an idle one of said channels to said first station, and
wherein said deducting means comprises means responsive to an answer signal on said idle channel for computing a second interval of time between said alerting signal and said idle channel answer signal.

3. In a communication system having a plurality of customer stations, communication circuits and means for interconnecting said stations to said circuits for communication, an arrangement for ascertaining the usage of said circuits by said stations comprising:
means for recording the elapsed time that each said station is connected to one of said circuits,
means for monitoring said circuits for detecting when a first one of said stations has disconnected from one of said circuits,
means responsive to said monitoring means for utilizing a second one of said stations for reestablishing a connection from said first station to an idle one of said circuits,
means for measuring the time for reestablishing said connection to said first station, and
means for adjusting the elapsed time for said second station in accordance with said measured time.

4. For use in a conference arrangement comprising a multiport transmission bridge and communication circuits for interconnecting a plurality of customer stations to said bridge for conferencing, a method for ascertaining the usage of said circuits comprising the steps of:
recording the elapsed time interval that each said station is connected to the bridge via one of said communication circuits,
signaling a first one of said stations when another one of said stations has disconnected from said bridge,
reestablishing under control of said first station a connection to said other station, and
deleting from the elapsed time recorded for said first station the time for reestablishing the connection.

5. For use in a dial-up, customer-controlled conference arrangement comprising a multiport transmission bridge and communication circuits for interconnecting a plurality of customer stations to said bridge for conferencing, a method for ascertaining the usage of said conference arrangement comprising the steps of:
recording an individual elapsed time interval for the usage of each communication circuit interconnecting a customer station to the bridge,
recording the elapsed time interval for the bridge usage during which at least one of said stations is connected to the bridge,
summoning an operator to be connected to said bridge,
recording an elapsed allowance time for each said interconnected communication circuit as long as said operator is connected to said bridge, and
deducting the elapsed allowance time from the elapsed usage time recorded for each communication circuit.

6. For use in a communication network having a multiport conference bridge, customer stations and switching means for establishing communication channels between said stations and said bridge for conferencing, an arrangement for ascertaining the usage of said bridge and channels comprising:
means for recording for each channel the elapsed time that each said channel is connected to an associated one of said stations,
means for recording for said bridge the elapsed time that at least one of said stations is connected to said bridge via its said associated channel,
means for detecting when a first one of said stations disconnects from its associated channel,
means including a second one of said stations responsive to said detecting means for utilizing its associated channel for establishing an idle one of said channels to said first station,
means for ascertaining the interval of time required by the channel associated with said second station to establish an idle channel to said first station, and
means for deducting said ascertained time from the elapsed time recorded for the channel associated with said second station.

* * * * *